United States Patent
Takemoto

(10) Patent No.: US 10,381,807 B2
(45) Date of Patent: Aug. 13, 2019

(54) DISCHARGE GENERATOR

(71) Applicant: DENSO CORPORATION, Kariya, Aichi-pref. (JP)

(72) Inventor: Shoichi Takemoto, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/204,006

(22) Filed: Nov. 29, 2018

(65) Prior Publication Data

US 2019/0165551 A1 May 30, 2019

(30) Foreign Application Priority Data

Nov. 30, 2017 (JP) .................................. 2017-230704

(51) Int. Cl.
| | |
|---|---|
| *H02J 9/02* | (2006.01) |
| *H02J 1/10* | (2006.01) |
| *H01T 23/00* | (2006.01) |
| *C01B 13/11* | (2006.01) |
| *F01N 9/00* | (2006.01) |

(52) U.S. Cl.
CPC .............. *H01T 23/00* (2013.01); *C01B 13/11* (2013.01); *F01N 9/005* (2013.01); *C01B 2201/14* (2013.01); *C01B 2201/20* (2013.01)

(58) Field of Classification Search
CPC ... B60R 16/03; B60R 16/0315; B60R 21/017; B60R 25/04; Y02T 10/7005; H02J 7/1438; H02J 1/10; H02J 3/46; H02J 3/38; H02J 3/06; H02J 1/102; H02J 7/35; F02N 11/087; F02N 11/0807; F02N 11/0866; F02N 11/103; B60Q 1/143; B60Q 2300/312; B60Q 2300/314; B60Q 2300/052; B60Q 1/1423; H02H 7/062; Y02E 60/12; G06F 1/26

See application file for complete search history.

(56) References Cited

U.S. PATENT DOCUMENTS

2007/0205727 A1   9/2007   Tamita et al.

FOREIGN PATENT DOCUMENTS

JP   2009-224244   10/2009

*Primary Examiner* — Minh D A
(74) *Attorney, Agent, or Firm* — Nixon & Vanderhye P.C.

(57) ABSTRACT

In a discharge generator, a control unit switchably performs a continuous mode and a burst mode based on determination of whether target output power is higher than discharge start power. The burst mode alternately performs a discharge mode and a non-discharge mode. The control unit causes a burst ratio to be set to a value expressed by the following equation $b=P_o^*/P_{fs0}$ where b represents the burst ratio, $P_o^*$ represents the target output power, and $P_{fs0}$ represents the discharge start power. The burst ratio is defined as a ratio of the discharge period to a burst period. The burst period is the sum of the discharge period and the stop period. The control unit causes, in the burst mode, the switch circuit to output, as the output power, the discharge start power during the discharge period.

6 Claims, 25 Drawing Sheets

DISCHARGE GENERATOR

CROSS REFERENCE TO RELATED APPLICATIONS

This application is based on and claims the benefit of priority from Japanese Patent Application 2017-230704 filed on Nov. 30, 2017, the disclosure of which is incorporated in its entirety herein by reference.

TECHNICAL FIELD

The present disclosure relates to discharge generators for causing a discharge load to generate discharge, i.e. electrical discharge.

BACKGROUND

Resonant inverters, which are an example of discharge generators, are configured to cause a discharge load, such as an ozonizer, to generate discharge. An example of which is disclosed in Japanese Patent Publication No. 4108108. Such a resonant inverter includes a main circuit unit including switching elements, and a control unit.

The control unit controls on-off switching operations of each switching element to thereby convert an input direct-current (DC) voltage input from a DC power source into an alternating-current (AC) voltage. Then, the resonant inverter outputs the AC voltage to a resonant circuit while causing a switching frequency of each switching element to resonate with a predetermined resonant frequency of a resonant circuit including a discharge load, thus applying a boosted AC voltage to the discharge load. This causes the discharge load to generate discharge.

Such a discharge load has a discharge start voltage as its one characteristic. The discharge start voltage represents a minimum voltage required for the discharge load to generate discharge. Note that power required for the discharge load to generate discharge will also be referred to as discharge start power. If output power supplied from the main circuit unit to the discharge load is lower than the discharge start power, no discharge is generated by the discharge load.

SUMMARY

There have been requests for activating the discharge load independently of the output power supplied to the discharge load being higher or lower than the discharge start power.

For addressing such requests, the inventors consider that the control unit of the resonant inverter is configured to perform both a continuous mode and a burst mode.

When performing the continuous mode, the control unit continuously performs alternative turn-on and turn-off switching operations of each switching element in a predetermined switching cycle. The control unit performs the continuous mode upon the output power supplied form the main circuit unit to the discharge load being higher than the discharge start power.

In contrast, the control unit performs the burst mode upon the output power supplied form the main circuit unit to the discharge load being lower than the discharge start power. When performing the burst mode, the control unit alternately performs a discharge mode and a non-discharge mode. In the discharge mode, the control unit controls on-off switching operations of the switching elements to thereby cause the discharge load to generate discharge. In the non-discharge mode, the control unit does not drive the switching elements, to thereby prevent the discharge load from generating discharge.

That is, the burst mode is configured to supply, in the discharge mode, the output power, whose level is sufficiently higher than the discharge start power, to the discharge load to thereby cause the discharge load to generate discharge. In addition, the burst mode alternately performs the discharge mode and non-discharge mode to thereby reduce an average value of the output power to be lower than the discharge start power.

The above resonant inverter is configured such that the level of the output power to be supplied to the discharge load in the discharge mode is sufficiently higher than the discharge start power. This may cause a large amount of input power to be supplied from the DC power source to the main circuit unit, resulting in an increase of an amount of heat generated by electronic components, such as the switching elements, constituting the main circuit unit. This may result in a possibility of an increase of power conversion loss in the main circuit unit.

In view of the circumstances set forth above, an aspect of the present disclosure seeks to provide discharge generators, each of which is capable of reducing power conversion loss in a main circuit unit thereof.

A discharge generator according to a first exemplary aspect of the present disclosure includes a switch circuit including a switch connected to a direct-current power source, and a control unit configured to control on-off switching operations of the switch to thereby convert direct-current power supplied from the direct-current power source to the switch circuit into alternating-current output power, thus causing a discharge load to generate discharge based on the output power. The control unit is configured to switchably perform a continuous mode and a burst mode in accordance with determination of whether target output power as a target value of the output power is higher than predetermined discharge start power. The continuous mode continuously performs on-off switching operations of the switch, and the burst mode alternately performs a discharge mode that performs on-off switching operations of the switch to thereby cause the discharge load to generate discharge during a discharge period, and a non-discharge mode that performs no switching operations of the switch to thereby prevent the discharge load from generating discharge during a stop period. The discharge start power is the minimum power required for the discharge load to generate discharge. The control unit is configured to control, in the burst mode, on-off switching operations of the switch to thereby cause a burst ratio to be set to a value expressed by the following equation (1):

$$b = Po^* / P_{fs0} \quad (1)$$

where b represents the burst ratio, Po* represents the target output power, and $P_{fs0}$ represents the discharge start power.

(2) The burst ratio is defined as a ratio of the discharge period to a burst period, the burst period being the sum of the discharge period and the stop period. The control unit is configured to control, in the burst mode, on-off switching operations of the switch to thereby cause, in the burst mode, the switch circuit to output, as the output power, the discharge start power during the discharge period.

A discharge generator according to a second exemplary aspect of the present disclosure includes a switch circuit including a switch connected to a direct-current power source, and a control unit configured to control on-off switching operations of the switch to thereby convert direct-current power supplied from the direct-current power source to the switch circuit into alternating-current output power, thus causing a discharge load to generate discharge based on the output power. The control unit is configured to switchably perform a continuous mode and a burst mode in accordance with determination of whether target output power as a target value of the output power is higher than predetermined discharge sustaining power. The continuous mode continuously performs on-off switching operations of the switch. The burst mode alternately performs a discharge mode that performs on-off switching operations of the switch to thereby cause the discharge load to generate discharge during a discharge period, and a non-discharge mode that performs no switching operations of the switch to thereby prevent the discharge load from generating discharge during a stop period. The discharge sustaining power is the minimum power required for the discharge load to sustain the discharge generated by the discharge mode. The control unit is configured to control, in the burst mode, on-off switching operations of the switch to thereby cause a burst ratio to be set to a value expressed by the following equation (2):

$$b = Po^*/P_{fs1} \qquad (2)$$

where b represents the burst ratio, Po* represents the target output power, and $P_{fs1}$ represents the discharge sustaining power, the burst ratio being defined as a ratio of the discharge period to a burst period.

The control unit is configured to control, in the burst mode, on-off switching operations of the switch to thereby cause, in the burst mode, the switch circuit to output, as the output power, discharge start power and thereafter output the discharge sustaining power during the discharge period. The discharge start power is minimum power required for the discharge load to generate discharge.

In the discharge mode of the burst mode, the control unit is configured to control on-off switching operations of the switch to thereby cause the switch circuit to output the discharge start power during the discharge period. That is, this configuration of the control unit supplies, to the discharge load, the predetermined minimum power required for the discharge load to generate discharge during the discharge period.

This configuration therefore enables the input power supplied from the direct-current power source to the switch circuit to be lowered, making it possible to reduce power loss in the switch circuit.

Additionally, the control unit is configured to calculate the burst ratio in accordance with the above equation. This configuration enables the average value of the output power to be adjusted to the target output power. That is, the burst mode carried out by the control unit enables the product of the output power during the discharge period and the burst ratio to become the average value of the output power.

In the discharge mode of the burst mode, the control unit is configured to control on-off switching operations of the switch of the switch circuit to thereby cause the switch circuit to selectively output the discharge start power and the discharge sustaining power during the predetermined discharge period.

That is, the control unit causes the switch circuit to output the discharge start power, and thereafter causes the switch circuit to output the discharge sustaining power during the discharge period.

That is, because the discharge start power is output from the switch circuit to the discharge load at the start of the discharge task during the discharge period, this configuration of the discharge generator enables the discharge load to reliably generate discharge.

In addition, because the discharge sustaining power is output from the switch circuit to the discharge load after the discharge is generated during the discharge period, this configuration of the discharge generator enables the total output power during the discharge period to be lowered.

This configuration therefore enables the input power supplied from the direct-current power source to the switch circuit to be lowered, making it possible to reduce power loss in the switch circuit.

Additionally, the control unit is configured to calculate the burst ratio in accordance with the above equation (2).

The control unit adjusts the output power to the discharge sustaining power during most period in the discharge period. Adjusting the burst ratio to the value based on the equation (2) therefore enables the product of the burst ratio and the discharge sustaining power to be output as the average value of the output power. That is, this configuration of the discharge generator enables the target output power to be output from the switch circuit as the average value of the output power.

Note that the discharge start power does not strictly represent the minimum power required for the discharge load to generate discharge, and can include a value higher by 5% than the minimum power.

Similarly, the discharge sustaining power does not strictly represent the minimum power required for the discharge load to sustain the discharge generated by the discharge mode, and can include a value higher by 5% than the minimum power.

The reasons are that it is possible to calculate each of the discharge start power and the discharge sustaining power with consideration of errors depending on the pressure, temperature, and humidity of gas flowing in the discharge load.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
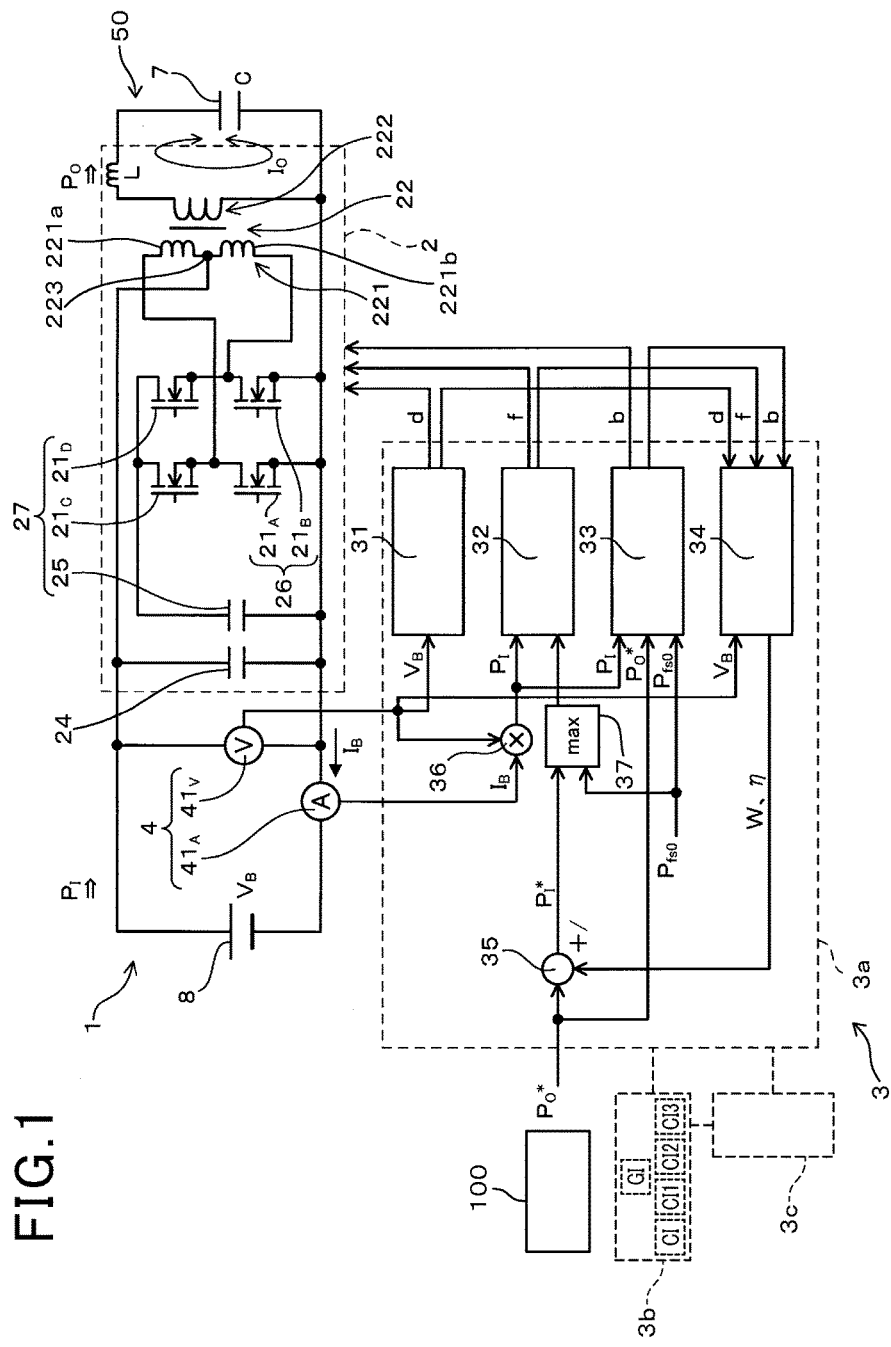
FIG. 1 is a circuit diagram schematically illustrating an overall configuration of a discharge generator according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

First, the following describes a discharge generator 1 according to the first embodiment of the present disclosure with reference to FIGS. 1 to 11.

For example, the discharge generator 1 according to the first embodiment is applied to be installed in a vehicle.

Referring to FIG. 1, the discharge generator 1 includes a main circuit unit 2 and a control unit 3. The main circuit unit 1 includes switches 21 electrically connected to a direct-current (DC) power source 8.

For example, the control unit 3 is comprised of, for example, a microcomputer including a CPU 3a, a memory 3b, and a peripheral circuit 3c. At least part of all functions provided by the control unit 3 can be implemented by at least one processor; the at least one processor can be comprised of (1) The combination of at least one programmed processing unit, i.e. at least one programmed logic circuit, and at least one memory (2) At least one hardwired logic circuit (3) At least one hardwired-logic and programmed-logic hybrid circuit Specifically, the control unit 3 controls on-off switching operations of each switch 21 to thereby convert input DC power $P_I$ input from the DC power source 8 into AC power $P_O$, and outputs the AC power Po to a resonant circuit 50 including a discharge load, such as a capacitive load, 7 while causing a switching frequency f of each switch 21 to resonate with a predetermined resonant frequency of the resonant circuit 50, thus applying a boosted AC voltage to the discharge load 7. This causes the discharge load 7 to generate discharge.

For example, a discharge reactor for generating ozone, which is to be supplied to, for example, an exhaust pipe of an internal combustion engine of the vehicle, is used as the discharge load 7. That is, the discharge generator 1 is configured to apply a boosted AC voltage across the discharge reactor, i.e. the discharge load 7, thus causing the discharge reactor 7 to generate ozone. The generated ozone is supplied to the exhaust pipe, and operative to reform exhaust gas output from the internal combustion engine via the exhaust pipe.

The main switch unit 2 includes first to fourth switches $21_A$ to $21_D$ as the switches 21, a transformer 21, a smoothing capacitor 24, and a capacitor 25. The first and second switches $21_A$ and $21_B$ constitute a push-pull circuit 26. The third and fourth switches $21_C$ and $21_D$ and the capacitor 25 constitute a resonant tank circuit 27.

The DC power source 8 has opposing positive and negative terminals, and the smoothing capacitor 24 has opposing positive and negative electrodes. The smoothing capacitor 24 is connected in parallel to the DC power source 8. The smoothing capacitor 24 is operative to smooth a DC voltage $V_B$ supplied from the DC power source 8.

The transformer 22 is comprised of a primary coil 221, a secondary coil 222, and a substantially cylindrical core (not shown). The primary coil 221 is wound around a part of the core, and the secondary coil 222 is wound around another part of the core such that the primary coil 221 is electrically isolated from the secondary coil 222 and magnetically linked thereto. The number of turns of the secondary coil 222 is set to be larger than the number of turns of the primary coil 221.

The primary coil 221 has a center tap 223 that divides the primary coil 221 into a first coil member $221_a$ and a second coil member $221_b$. The first coil member $221_a$ has a first end and a second end serving as the center tap 223, and the second coil member $221_b$ has a first end and a second end serving as the center tap 223.

The center tap 223 is connected to the positive electrode of the smoothing capacitor 24 and also to the positive terminal of the DC power source 8. The secondary coil 222 has opposing first and second ends. The first end of the secondary coil 222 is connected to a positive electrode of the discharge load 7, and the second end of the secondary coil 222 is connected to the negative electrode of the smoothing capacitor 24 and also to the negative terminal of the DC power source 8 via a common signal ground. The negative electrode of the discharge load 7 is connected to the negative electrode of the smoothing capacitor 24 and also to the negative terminal of the DC power source 8 via the common signal ground.

Each of the first and second switches $21_A$ and $21_B$ is comprised of a switching element, such as a MOSFET (MOS) whose intrinsic diode serves as a flyback or freewheel diode. An IGBT can be used as the switching element. An additional diode can be used to be connected in antiparallel to each switching element as a flyback diode. The first switch $21_A$ is connected between the first end of the first coil member $221_a$ and the negative electrode of the smoothing capacitor 24 via the common signal ground. Specifically, the first main switch $21_A$ has a first end connected to the first end of the first coil member $221_a$, and a second end connected to the negative electrode of the smoothing capacitor 24 via the common signal ground.

The second switch $21_B$ is connected between the first end of the second coil member $221_b$ and the negative electrode of the smoothing capacitor 24 via the common signal ground. Specifically, the second switch $21_B$ has a first end connected to the first end of the second coil member $221_b$, and a second end connected to the negative electrode of the smoothing capacitor 24 via the common signal ground.

The first and second switches $21_A$ and $21_B$ and the third and fourth switches $21_C$ and $21_D$ constitute a bridge circuit according to the first embodiment.

The capacitor 25 is comprised of a pair of positive and negative electrodes separated from one another. The positive electrode of the capacitor 25 is connected to the positive electrode of the smoothing capacitor 24, and the negative electrode of the capacitor 25 is connected to the negative electrode of the smoothing capacitor 24 via the common signal ground. The capacitor 25 has a predetermined capacitance.

The third switch $21_C$ is connected between the positive electrode of the capacitor 25 and the connection point between the first switch $21_A$ and the first coil member $221_a$. Specifically, the third switch $21_C$ has a first end connected to the positive electrode of the capacitor 25, and has a second end connected to the connection point between the first switch $21_A$ and the first coil member $221_a$.

The fourth switch $21_D$ is connected between the positive electrode of the capacitor 25 and the connection point between the second switch $21_B$ and the second coil member $221_b$. Specifically, the fourth switch $21_D$ has a first end connected to the positive electrode of the capacitor 25, and has a second end connected to the connection point between the second switch $21_B$ and the second coil member $221_b$.

Each of the first, second, third, and fourth switches $21_A$, $21_B$, $21_C$, and $21_D$ has a control terminal, which is the gate when the corresponding switch is a MOSFET, connected to the control unit 3.

The control unit 3 is configured to control on-off switching operations of each of the first, second, third, and fourth switches $21_A$, $21_B$, $21_C$, and $21_D$.

Figure 8:
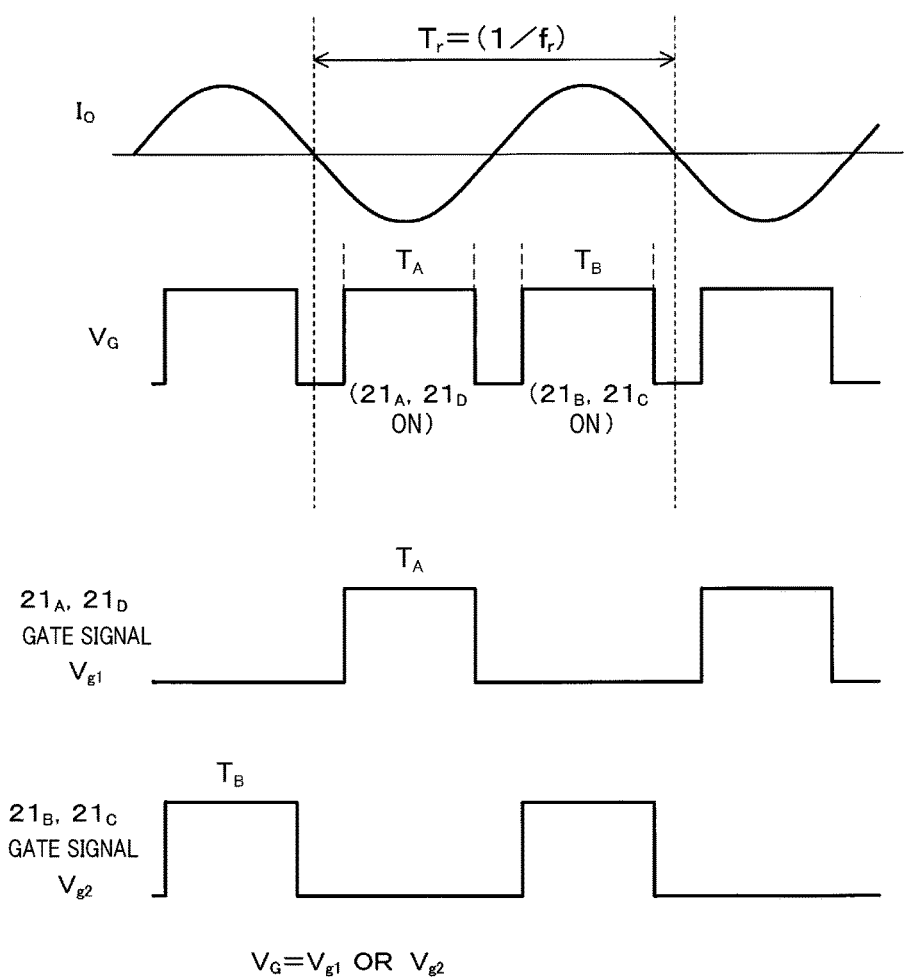
FIG. 8 is a timing chart schematically illustrating an example of a relationship between an output current and the gate voltage in the burst mode according to the first embodiment.

For example, as illustrated in FIG. 8, the control device 5 is configured to alternately control the first, second, third, and fourth switches $21_A$, $21_B$, $21_C$, and $21_D$ in a first switching pattern and a second switching pattern.

Specifically, the control unit 3 is configured in the first switching pattern to turn on and hold on the first switch $21_A$ and the fourth switch $21_D$ based on a control voltage, i.e. a gate voltage $V_G$, during a predetermined duration TA while holding off the second switch $21_B$ and the third switch $21_C$.

Additionally, the control unit 3 is configured in the second switching pattern to turn on and hold on the second switch $21_B$ and the third switch $21_C$ based on the control voltage, i.e. the gate voltage $V_G$, during a predetermined duration TB, which is set to be equal to the duration TA, while holding off the first switch $21_A$ and the fourth switch $21_D$.

That is, the control unit 3 is configured to switch between the first switching pattern and the second switching pattern to cause the switching frequency f of each of the first to fourth switches $21_A$ to $21_D$ to be close to a predetermined resonant frequency of the resonant circuit 50, i.e. resonate with a predetermined resonant frequency of the resonant circuit 50.

This causes the input power $P_I$ to be converted into the AC power $P_O$ as the output of the secondary coil 222 while causing the frequency of an output current, i.e. an output alternating current, Io output from the secondary coil 222 as the output power $P_O$ to resonate with the resonant frequency of the resonant circuit 50. This boosts the output current Io, i.e. output power.

Note that the control unit 3 is configured to (1) Turn on one of the switches $21_A$ and $21_C$ when dead time has elapsed since turn off of the other of the switches $21_A$ and $21_C$ to prevent the switches $21_A$ and $21_C$ from being simultaneously in the on state (2) Turn on one of the switches $21_B$ and $21_D$ when dead time has elapsed since turn off of the other of the switches $21_B$ and $21_D$ to prevent the switches $21_B$ and $21_D$ from being simultaneously in the on state In particular, the resonant circuit 50 includes a capacitance C of the discharge load 7 and a leakage inductance L of the secondary winding 222 of the transformer 22 connected to the discharge load 7. That is, the resonant circuit 50 has the resonant frequency, referred to as fr, which is expressed by fr=1/2πLC That is, the discharge generator 1 causes the frequency of the output current Io, which is boosted based on the turn ratio between the primary and secondary coils 221 and 222, to resonate with the resonant frequency fr of the resonant circuit 50. This strongly boosts the output current Io, i.e. output power Po, thus generating a very high voltage Vo as the output power Po across the discharge load 7. This causes the discharge load 7 to generate discharge between its electrodes.

An external controller 100 installed in the vehicle is configured to send a target value for the output power Po, which will be referred to as target output power Po*, to the control unit 3 every predetermined control cycle.

Figure 3:
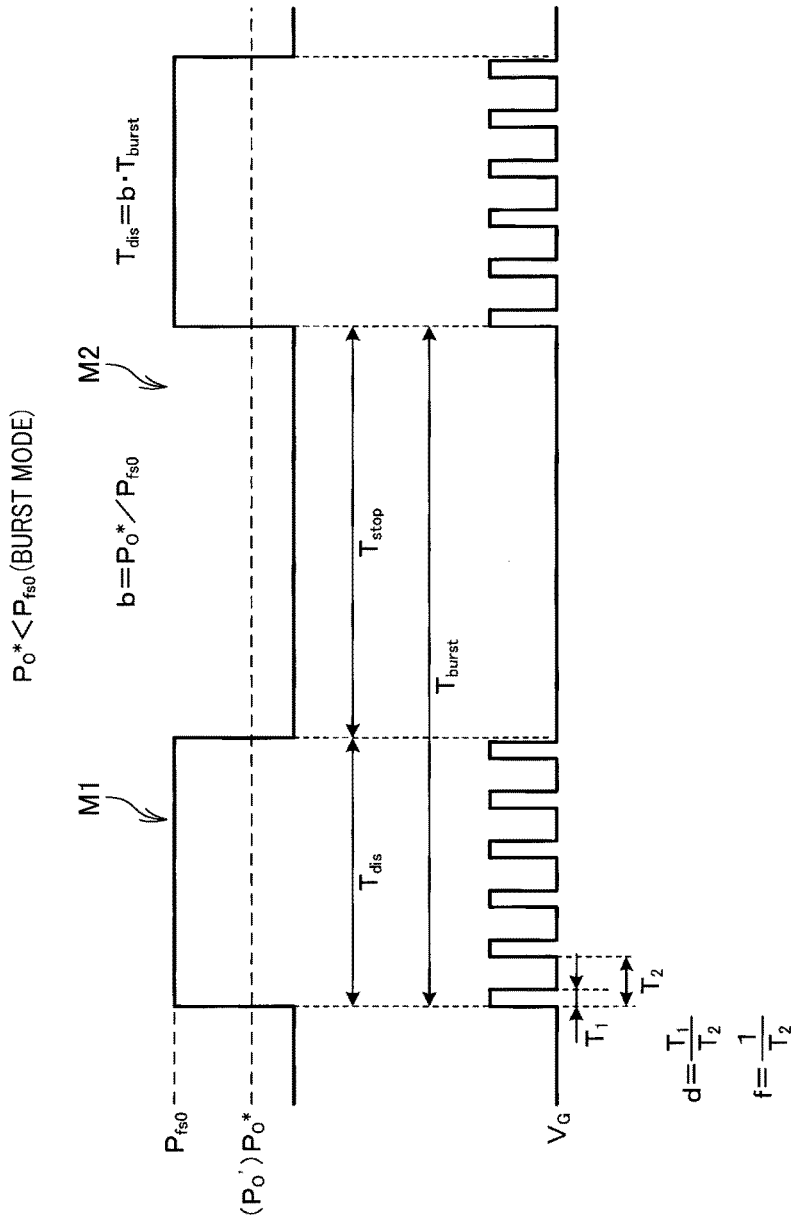
FIG. 3 is a timing chart schematically illustrating an example of a relationship between an output voltage and a gate voltage in the burst mode according to the first embodiment.

The control unit 3 is configured to switchably, i.e. selectably, perform a continuous mode (see FIG. 5) and a burst mode (see FIG. 3). That is, the control unit 3 is configured to perform the continuous mode upon determining that the target output power $P_O^*$ is higher than predetermined discharge start power $P_{fs0}$; the discharge start power $P_{fs0}$ represents predetermined minimum power required for the discharge load 7 to generate discharge.

Figure 5:
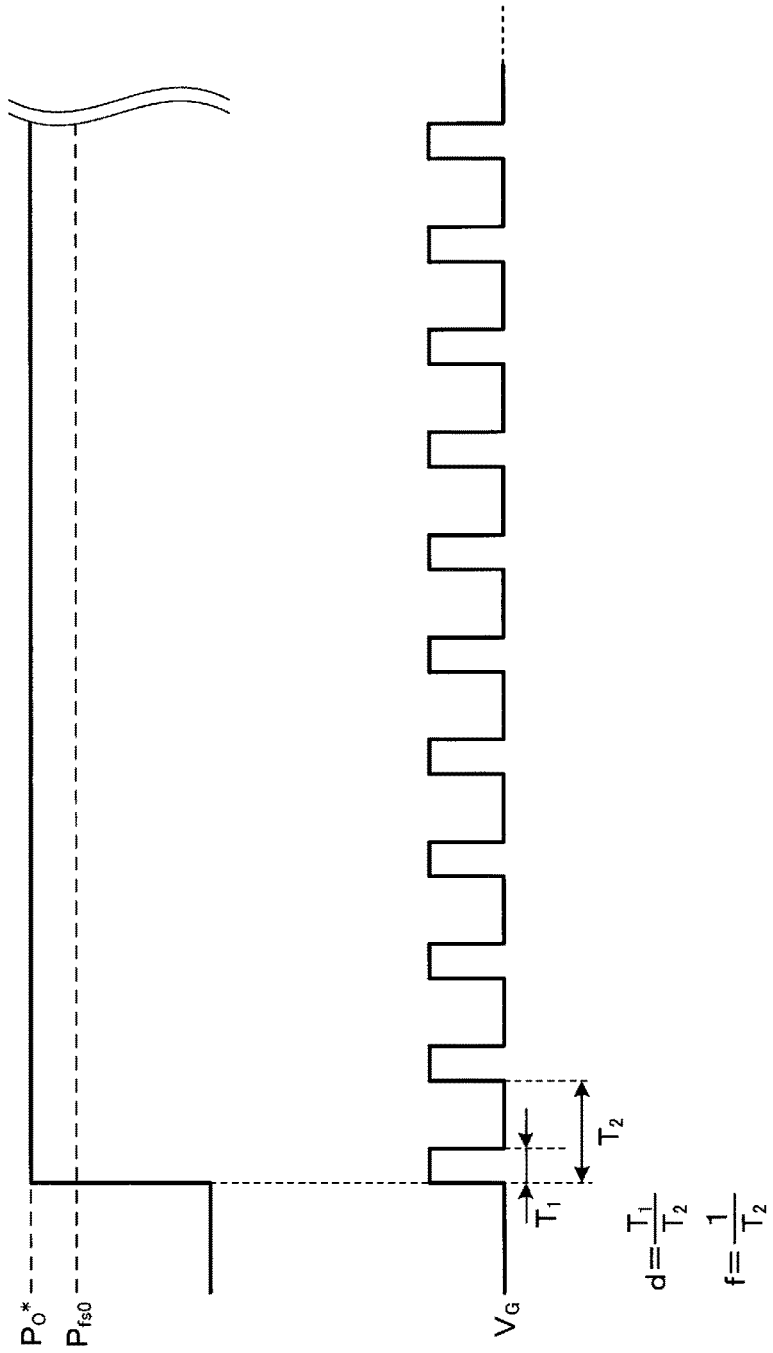
FIG. 5 is a timing chart schematically illustrating an example of the output voltage and the gate voltage in the burst mode according to the first embodiment.

When performing the continuous mode, the control unit 3 continuously performs alternative turn-on of the first set of the switches $21_A$ and $21_D$ based on the gate voltage $V_G$ in the first switching pattern and the second set of the switches $21_B$ and $21_C$ in the second switching pattern in a variable switching cycle (see FIG. 5).

In contrast, the control unit 3 is configured to perform the burst mode upon determining that the target output power Po* is equal to or lower than the discharge start power $P_{fs0}$.

When performing the burst mode, the control unit 3 alternately performs a discharge mode M1 and a non-discharge mode M2. In other words, the control unit 3 cyclically performs the set of the discharge mode M1 and the non-discharge mode M2 in the burst mode. One cycle of the set of the discharge mode M1 and the non-discharge mode M2 will be referred to as a burst cycle.

In the discharge mode M1, the control unit 3 controls alternative turn-on of the first set of the switches $21_A$ and $21_D$ based on the gate voltage $V_G$ in the first switching pattern and the second set of the switches $21_B$ and $21_C$ based on the gate voltage $V_G$ in the second switching pattern during a predetermined first discharge period $T_{dis}$ to thereby cause the discharge load 7 to generate discharge and sustain the generated discharge.

In the non-discharge mode M2, the control unit 3 drives no switches $21_A$ to $21_D$ in a predetermined stop period $T_{stop}$ to thereby prevent the discharge load 7 from generating discharge. The first discharge period $T_{dis}$ of a switch represents a period during which the switch is turned on at the switching cycle while a duty factor d of the switch is set to a duty factor. The stop period $T_{stop}$ of a switch refers to a period during which the switch is kept off. The duty factor d for a switch represents a controllable ratio, i.e. percentage, of an on duration (see T1 in FIG. 3) of the switch to a total duration (see T2) of a switching cycle. Note that the sum of the first discharge period $T_{dis}$ and the stop period $T_{stop}$ constitute a burst period $T_{burst}$ (see FIG. 3).

Specifically, the control unit 3 is configured to control a burst ratio b, which is expressed by the following equation (1), to thereby cause the main circuit unit 2 to output the output power $P_O$ that is equal to or higher than the discharge start power $P_{fs0}$ during the first discharge period $T_{dis}$:

$$b = P_O^*/P_{fs0} \tag{1}$$

Referring to FIG. 1, the control unit 3 includes a duty controller 31, a frequency controller 32, a burst controller 33, a calculator 34, an input power calculator 35, a multiplier 36, and a selector 37.

The duty controller 31 is configured control the duty factor d of each of the first to fourth switches $21_A$ to $21_D$ (see FIGS. 3 and 5), and the frequency controller 32 is configured to control the switching frequency f of each of the first to fourth switches $21_A$ to $21_D$.

The burst controller 33 is configured to control the burst ratio b of each of the first to fourth switches $21_A$ to $21_D$ (see FIG. 3).

That is, controlling the duty factor d, the switching frequency f, the burst ratio b of each of the first to fourth switches $21_A$ to $21_D$ causes the output power Po to be closer to the target output power $P_O^*$.

Figure 6:
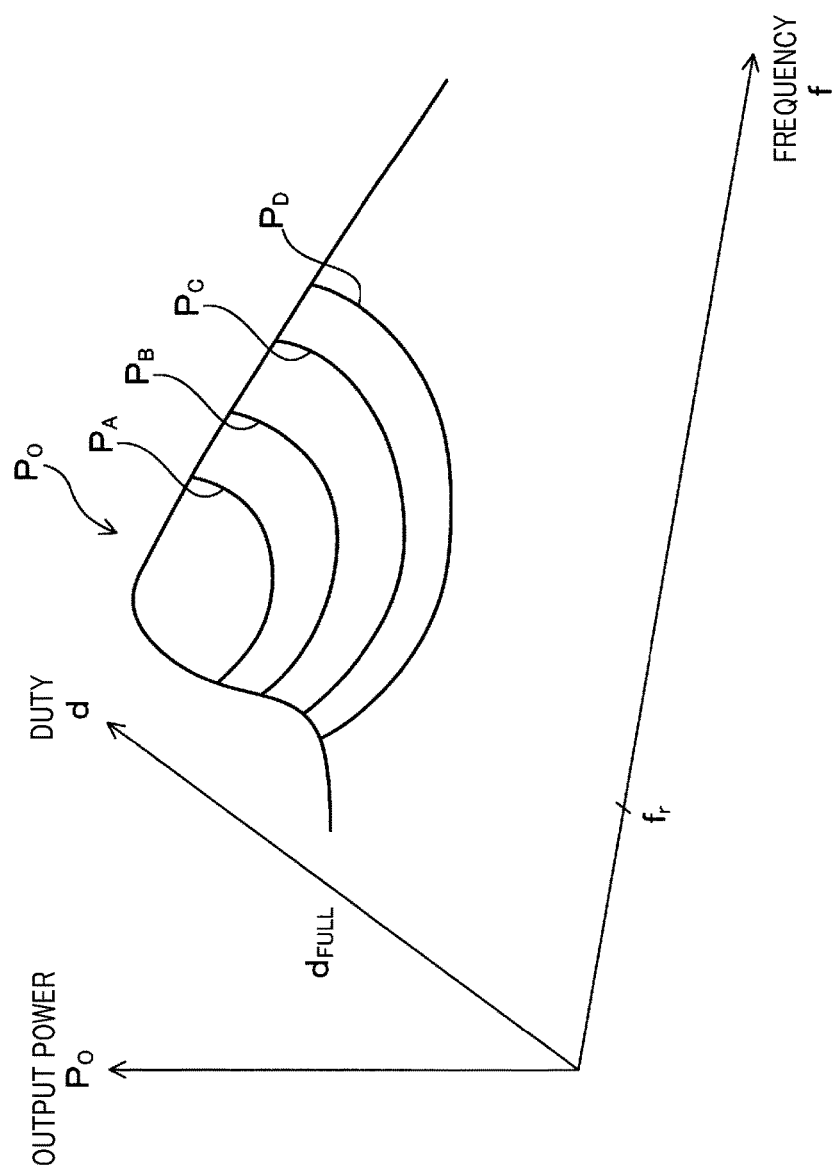
FIG. 6 is a graph schematically illustrating an example of a three-dimensional graph schematically illustrating the relationships between the switching frequency, the output power, and a duty factor according to the first embodiment.

The duty controller 31 for example uses information GI stored in the memory 3b; the information GI represents information, such as map information or equation information, about the output power Po expressed as a function of the duty factor d and the switching frequency f FIG. 6 illustrates a three-dimensional graph showing the output power Po as a function of the duty factor d and the switching frequency f. In the graph of FIG. 6, the same level curves $P_A$, $P_B$, $P_C$, and $P_D$ of the output power Po are plotted.

FIG. 6 shows that (1) The closer the switching frequency f to the resonant frequency fr is, the higher the output power Po is, while the duty d is set to be a constant value (2) The higher the duty factor d is, the higher the output power Po is, while the switching frequency f is set to be a constant value Note that the duty factor d can be set to be equal to or lower than a full duty $d_{FULL}$. In other words, the duty controller 31 is capable of changing the duty factor d of each of the first to fourth switches $21_A$ to $21_D$ as long as the duty factor d does not exceed the full duty $d_{FULL}$.

Figure 7:
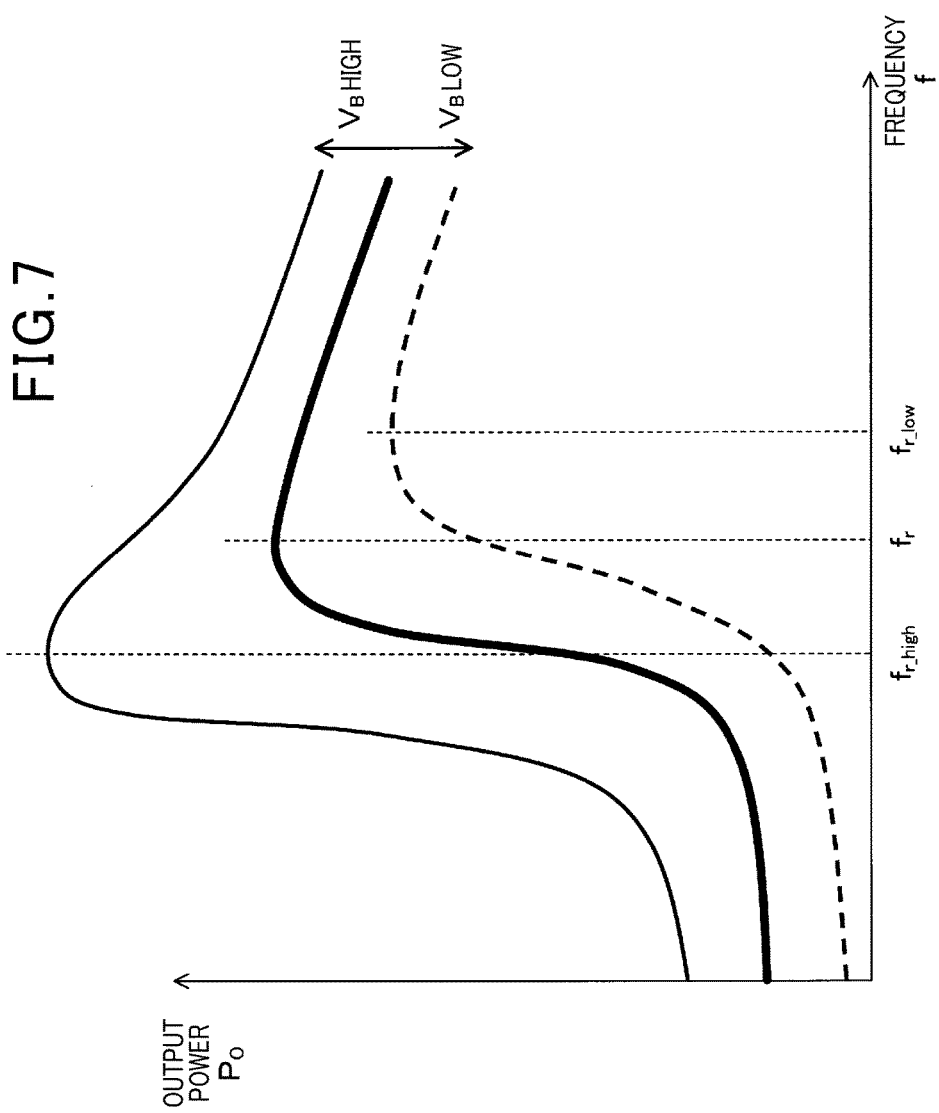
FIG. 7 is a graph schematically illustrating the relationships between the switching frequency, the output power, and a power supply voltage according to the first embodiment.

FIG. 7 schematically illustrates

1. A first relationship between the switching frequency f and the output power Po with the DC voltage $V_B$ of the DC power source 8 having a value $V_M$ (see fine curve)

2. A second relationship between the switching frequency f and the output power Po with the DC voltage $V_B$ of the DC power source 8 having a value $V_H$ higher than the value $V_M$ (see heavy curve)

3. A third relationship between the switching frequency f and the output power Po with the DC voltage $V_B$ of the DC power source 8 having a value $V_L$ lower than the value $V_M$ (see dashed curve)

As illustrated in FIG. 7, the closer the switching frequency f to the resonant frequency fr, the more the output power Po increases. An increase in the DC voltage $V_B$ of the DC power source 8 causes the output power Po to increase, and a decrease in the DC voltage $V_B$ of the DC power source 8 causes the output power Po to decrease.

The DC power source 8 according to the first embodiment is connected to, in addition to the discharge generator 1, a plurality of electrical loads including, for example, an air-conditioner and lights installed in the vehicle. The DC power source 8 is, for example, designed as a zinc battery.

The DC voltage $V_B$ of the DC power source 8 may therefore suddenly vary depending on the usage situations of the electrical loads 3. This sudden variation of the DC voltage $V_B$ of the DC power source 8 may cause the output power Po to be suddenly deviate from the target output power $P_O^*$.

From this viewpoint, the control unit 3 is configured to, even if the output power Po suddenly deviates from the target output power $P_O^*$, perform a power control task, which will be described below, to thereby immediately return the deviated output power Po to the target output power $P_O^*$.

For example, if the DC voltage $V_B$ of the DC power source 8 suddenly decreases, so that the output power Po also suddenly decreases, the control unit 3 performs the power control task to increase the duty factor d of each switch 21 while maintaining the switching frequency f thereof at a constant value. This results in an increase of the output power Po.

Specifically, the control unit 3 performs feedforward control of the duty factor d of each switch 21 using the DC voltage $V_B$ of the DC power source 8. This feedforward control of the duty factor d of each switch 21 enables the output power Po to be returned to a value relatively close to the target output power $P_O^*$ in a shorter time.

After the feedforward control of the duty factor d of each switch 21, the power control task performs feedback control of the switching frequency f of each switch 21. This feedback control of the switching frequency f of each switch 21 enables the output power Po to be precisely closer to the target output power $P_O^*$ although this feedback control takes some time.

That is, if the output power Po suddenly changes, the control unit 3 performs feedforward control of the duty factor d of each switch 21 to thereby return the output power Po to a value relatively close to the target output power $P_O^*$ first, and thereafter performs feedback control of the switching frequency f of each switch 21 to thereby cause the output power Po to be precisely closer to the target output power $P_O^*$.

In addition, as described above, the discharge generator 1 applies the output power Po across the discharge load, i.e. discharge reactor, 7 to thereby cause the discharge load 7 to generate discharge therein. The generated discharge, i.e. discharged current, enables ozone to be generated from the discharge load 7. The generated ozone is supplied to the exhaust pipe of the internal combustion engine, making it possible to reform the exhaust gas exhausted via the exhaust pipe.

As described above, the discharge load 7 is configured to start discharge only when the output power Po applied thereto is equal to or higher than the discharge start power $P_{fs0}$.

On the other hand, from another viewpoint, if there is a case where the amount of nitrogen oxide (NOx) included in the exhaust gas per unit volume is relatively small, a minimum amount of ozone required to resume the exhaust gas may become smaller.

For addressing such a case, the control unit 3 according to the first embodiment is configured to perform the burst mode in addition to the continuous mode to thereby cause the discharge load 7 to generate discharge normally, making it possible to generate ozone based on the generated discharge.

Specifically, when performing the burst mode, the control unit 3 alternately performs the discharge mode M1 and the non-discharge mode M2.

In the discharge mode M1, the control unit 3 controls on-off switching operations of the switching elements to thereby adjust the output power Po of the main circuit unit 2 to the discharge start power $P_{fs0}$ during the predetermined first discharge period $T_{dis}$. This causes the discharge load 7 to generate discharge and sustain the generated discharge.

In contrast, in the non-discharge mode M2, the control unit 3 drives no switches $21_A$ to $21_D$ during the predetermined stop period $T_{stop}$ to thereby prevent the discharge load 7 from generating discharge.

That is, alternately performing the discharge mode M1 and non-discharge mode M2 results in an average value Po' of the output power Po decreasing to be equal to or lower than the discharge start power $P_{fs0}$.

Note that the control unit 3 according to the first embodiment is configured to control the switching frequency f of each switch 21 in the discharge mode M1 during the first discharge period $T_{dis}$ to thereby adjust the output power Po to the discharge start power $P_{fs0}$.

Figure 2:
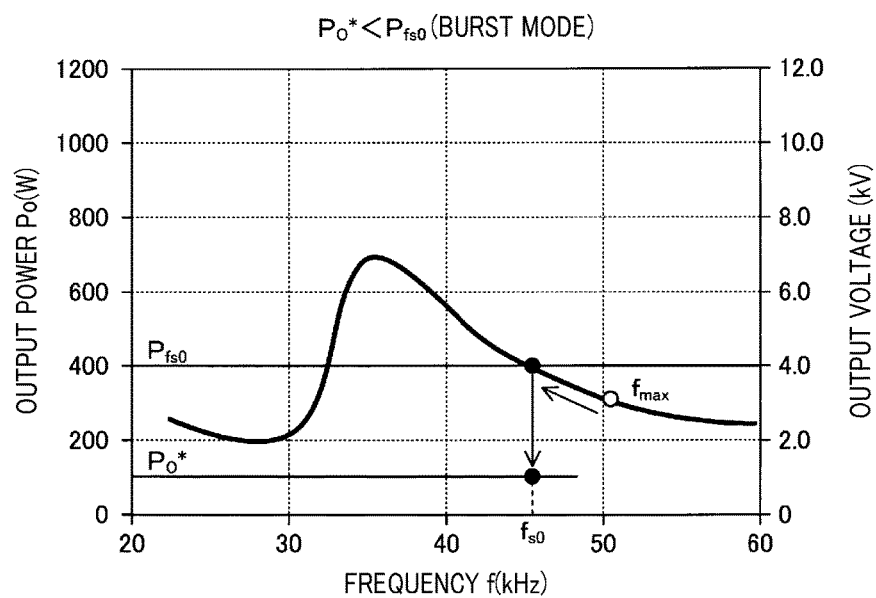
FIG. 2 is a graph schematically illustrating an example of a relationship among output power, an output voltage, and a switching frequency in a burst mode according to the first embodiment.

Specifically, as illustrated in FIG. 2, the control unit 3 adjusts the switching frequency f of each switch 21 to a predetermined maximum frequency $f_{max}$ first at the start of the discharge mode M1. Then, the control unit 3 gradually reduces the switching frequency f from the maximum frequency $f_{max}$ to thereby adjust the value of the switching frequency f to a frequency fo corresponding to the discharge start power $P_{fs0}$.

For example, the control unit 3 stores, in the memory 3b, an example of information, such as map information or equation information, indicative of the relationship between the output power Po (or the output voltage) and the switching frequency f an example of which is illustrated in FIG. 2.

That is, the control unit 3 can adjust a value of the switching frequency f of each switch 21 in accordance with a value of the output power Po and/or a value of the output voltage, and the relationship stored in the memory 3b.

In contrast, the control unit 3 performs the continuous mode upon determining that the target output power $P_O^*$ is higher than the discharge start power $P_{fs0}$ (see FIG. 5).

When performing the continuous mode, the control unit 3 continuously performs alternative turn-on of the first set of the switches $21_A$ and $21_D$ in the first switching pattern and the second set of the switches $21_B$ and $21_C$ in the predetermined switching cycle.

Like the burst mode, the control unit 3 according to the first embodiment is configured to control the switching frequency f of each switch 21 in the continuous mode to thereby adjust the output power Po to be closer to the target output power Po*.

Figure 4:
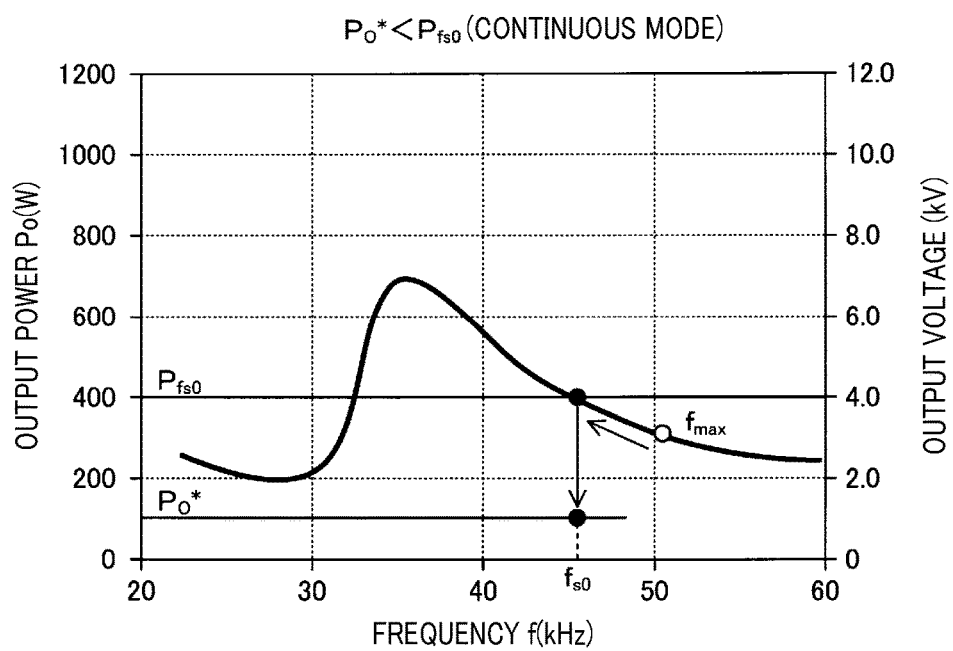
FIG. 4 is a graph schematically illustrating an example of a relationship among the output power, the output voltage, and a switching frequency in a continuous mode according to the first embodiment.

Specifically, as illustrated in FIG. 4, the control unit 3 adjusts the switching frequency f of each switch 21 to the predetermined maximum frequency $f_{max}$ first at the start of the continuous mode, which is similar to the burst mode. Then, the control unit 3 gradually reduces the switching frequency f from the maximum frequency $f_{max}$ to thereby adjust the value of the switching frequency f to the frequency f* corresponding to the target output power Po*.

In particular, the main circuit unit 2 includes a power measurement unit 4 comprised of a voltage sensor $41_A$ and a current sensor $41_B$. The voltage sensor $41_A$ is connected in parallel to the DC power source 8 and the smoothing capacitor 24, and is configured to measure the DC voltage $V_B$ output from the DC power source 8. Then, the voltage sensor $41_A$ is configured to output, to the control unit 3, a measurement signal indicative of a measured value of the DC voltage $V_B$.

The current sensor $41_B$ is connected between the negative electrode of the smoothing capacitor 24 and the negative terminal of the DC power source 8, and is configured to measure an input current $I_B$ output from the DC power source 8 and input to the main circuit unit 2. Then, the current sensor $41_B$ is configured to output, to the control unit 3, a measurement signal indicative of a measured value of the input current $I_B$.

The measurement signal indicative of the measured value of the DC voltage $V_B$ is input to the duty controller 31.

The duty controller 31 is configured to perform feedforward control of the duty factor d of each switch 21 in accordance with the measured value of the DC voltage $V_B$.

The measurement signal indicative of the measured value of the DC voltage $V_B$ and the measurement signal indicative of the measured value of the input current $I_B$ are also input to the multiplier 36.

The multiplier 36 is configured to multiply the measured value of the DC voltage $V_B$ and the measurement measured value of the input current $I_B$ are also input to the multiplier 36 between each other to thereby calculate input power $P_I$. The calculated input power $P_I$ is input to each of the frequency controller 32 and the burst controller 33.

The frequency controller 32 is configured to perform feedback control of the switching frequency f of each switch 21 such that the deviation of the input power $P_I$ from target input power $P_I^*$ or the discharge start power $P_{fs0}$ input from the selector 37 described later becomes smaller.

The burst controller 33 is configured to calculate, based on the discharge start power $P_{fs0}$ and the target output power Po*, the burst ratio b in accordance with the equation (1) set forth above.

These parameters d, f b, and the DC voltage VB are input to the calculator 34.

The calculator 34 is configured to calculate (1) Power loss W of the main circuit unit 2 based on values of these parameters d, f and VB in accordance with, for example, a predetermined relation equation or map among the power loss W and these parameters d, f, and VB if the continuous mode is carried out (2) The power loss W of the main circuit unit 2 based on values of these parameters d, f b, and VB in accordance with, for example, a predetermined relation equation or map among the power loss W and these parameters d, f b, and VB if the burst mode is carried out Then, the calculator 34 is configured to output the value of the power loss W to the input power calculator 34.

In addition, as described above, the target output power Po* sent from the external controller 100 to the control unit 3 is input to each of the input power calculator 35 and the selector 37.

The input power calculator 35 receives the target output power Po* and the value of the power loss W, and adds the value of the power loss W to the target output power Po*, thus calculating the target input power $P_I^*$ and outputting the calculated target input power $P_I^*$ to the selector 37.

If the target input power $P_I^*$ were input to the main circuit unit 2, the power loss W would be generated in the main circuit unit 2. For this reason, the discharge generator 1 is configured such that the main circuit unit 2 outputs a value of the output power Po, which is substantially equal to the subtraction of the power loss W from the target input power $P_I^*$, that is, the target output power Po*.

The calculator 34 can be configured to calculate (1) A circuit efficient $\eta$ of the main circuit unit 2 based on values of these parameters d, f and VB in accordance with for example, a predetermined relation equation or map among the circuit efficient $\eta$ and these parameters d, f, and VB if the continuous mode is carried out (2) The circuit efficiency $\eta$ of the main circuit unit 2 based on values of these parameters d, f b, and VB in accordance with, for example, a predetermined relation equation or map among the circuit efficiency $\eta$ and these parameters d, f, b, and VB if the burst mode is carried out Then, the calculator 34 can be configured to output the value of the circuit efficiency $\eta$ to the input power calculator 34.

At that time, the input power calculator 35 receives the target output power Po* and the value of the circuit efficiency $\eta$, and divides the target output power Po* by the value of the circuit efficiency $\eta$, thus calculating the target input power $P_I^*$ and outputting the calculated target input power $P_I^*$ to the frequency controller 32.

The selector 37 is configured to select one of the target input power $P_I^*$ and the discharge start power $P_{fs0}$; the selected one of the target input power $P_I^*$ and the discharge start power $P_{fs0}$ is higher than the other thereof. Then, the selector 37 is configured to output, to the frequency controller 32, the selected one of the target input power $P_I^*$ and the discharge start power $P_{fs0}$.

That is, power input to the frequency controller 32 is always equal to or higher than the discharge start power $P_{fs0}$.

Figure 9:
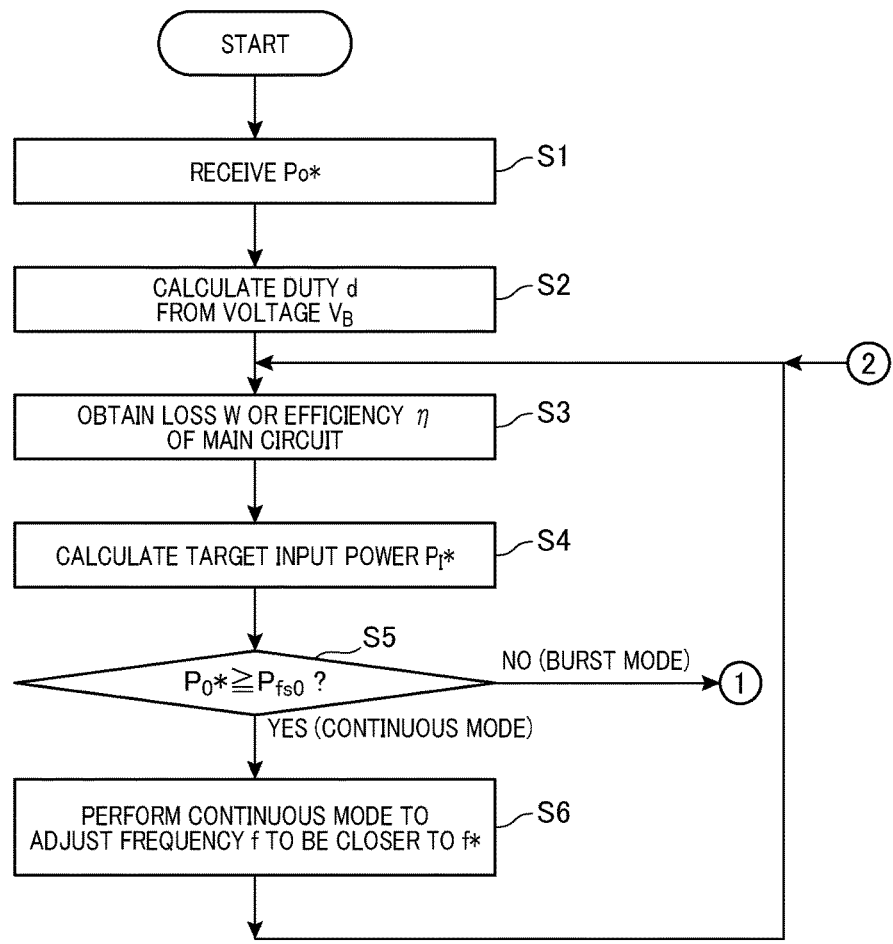
FIG. 9 is a flowchart schematically illustrating a part of a switch control routine carried out by a control unit illustrated in FIG. 1.
Figure 10:
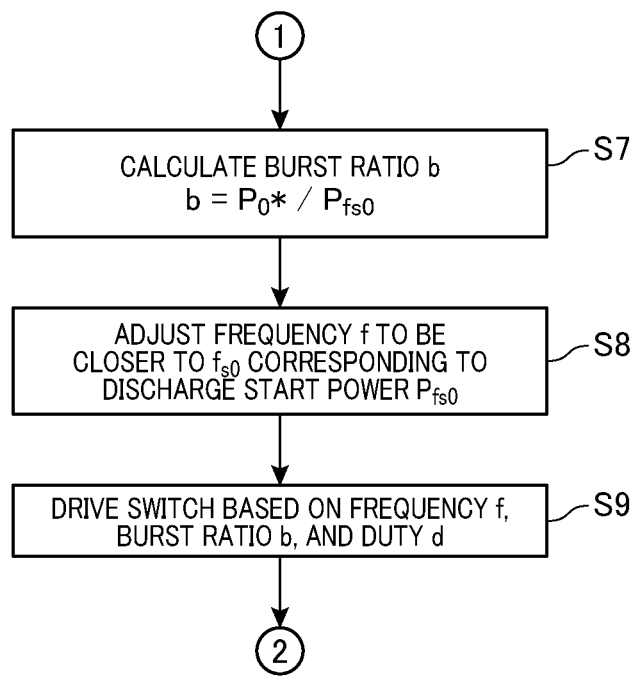
FIG. 10 is a flowchart schematically illustrating the remaining part of the switch control routine carried out by the control unit illustrated in FIG. 1.

Next, the following describes a switch control routine carried out by the control unit 3, i.e. its CPU 3a with reference to the flowchart of FIGS. 9 and 10. That is, the control unit 3 performs one of the continuous mode (see FIG. 5) and the burst mode (see FIG. 3) in accordance with the target output power Po*.

Note that the control unit 3 is programmed to execute the switch control routine each time the target output power Po* is input thereto at the control cycle. In other words, because the target output power Po* is output from the external controller 100, the control unit 3 is programmed to execute the switch control routine at the control cycle.

Referring to FIG. 9, when the target output power Po* is input to the control unit 3 from the external controller 100, the control unit 3 starts the switch control routine, and receives the target output power Po* input thereto from the external controller 100 in step S1. Note that an initial value of the switching frequency f is set to a maximum value $f_{max}$ as a current frequency value.

Next, the control unit 3 serves as, for example, the duty controller 31 to calculate a value of the duty cycle d of each switch 21 in accordance with the measured value of the DC voltage $V_B$ in step S2. For example, the control unit 3 calculates the value of the duty cycle d in accordance with correlation information CI stored in the memory 3b; the correlation information CI, which is map information or equation information, represents a correlation between values of the DC voltage $V_B$ and corresponding values of the duty cycle d suitable for the respective values of the DC voltage $V_B$.

Subsequently, the control unit 3 serves as, for example, the calculator 34 to calculate one of the power loss W and the circuit efficiency $\eta$ in step S3.

If the operation in step S3 is carried out at the first time, the control unit 3 calculates one of the power loss W and the circuit efficiency $\eta$ in accordance with the values of the parameters d, f, and VB for the continuous mode set forth above.

If the continuous mode is carried out by the control unit 3 in the current cycle of the switch control routine, the control unit 3 calculates one of the power loss W and the circuit efficiency $\eta$ in accordance with the values of the parameters d, f, and VB for the continuous mode set forth above. If the burst mode is carried out by the control unit 3, the control unit 3 calculates one of the power loss W and the circuit efficiency $\eta$ in accordance with the values of the parameters d, f b, and VB for the burst mode set forth above.

Following the operation in step S3, the control unit 3 serves as, for example, the input power calculator 35 to calculate the target input power target input power $P_I^*$ based on the calculated one of the power loss W and the circuit efficiency $\eta$ in step S4.

Next, the control unit 3 serves as, for example, a determiner to determine whether the target output power Po* is equal to or higher than the discharge start power $P_{fs0}$ in step S5.

Upon determining that the target output power Po* is equal to or higher than the discharge start power $P_{fs0}$ (YES in step S5), the control unit 3 determines execution of the continuous mode. Then, the control unit 3 serves as, for example, the frequency controller 32 and the duty controller 31 to perform the feedback control of the switching frequency f of each switch 21 in step S6.

That is, the control unit 3 decrements the switching frequency f from the current frequency value by a predetermined value, thus updating the decremented value of the switching frequency f as the current frequency value. This reduces the switching frequency f down toward the frequency f* corresponding to the target output power Po (see FIG. 4) in step S6.

Then, the control unit 3 performs the continuous mode to thereby perform alternative turn-on of the first set of the switches $21_A$ and $21_D$ in the first switching pattern and the second set of the switches $21_B$ and $21_C$ in the second switching pattern based on the duty cycle d by one switching cycle corresponding to the current frequency value of the switching frequency f in step S6 (see FIG. 5).

After completion of the operation in step S6, the control unit 3 repeatedly performs the operations in steps S3 to S6 until the determination in step S5 is negative, so that the switching frequency f gradually decreases.

Then, upon determining that the target output power Po* is lower than the discharge start power $P_{fs0}$ (NO in step S5), the control unit 3 determines execution of the burst mode. Then, the control unit 3 serves as, for example, the burst controller 33 to calculate the burst ratio b in accordance with the equation (1) in step S7.

Then, the control unit 3 serves as, for example, the frequency controller 32 to perform the feedback control of the switching frequency f of each switch 21 in step S8.

That is, the control unit 3 decrements the switching frequency f from the current value of the switching frequency f which is the maximum value $f_{max}$ at the first time, by a predetermined value, thus updating the decremented value of the switching frequency f as the current frequency value. This reduces the switching frequency f down toward the frequency $f_{s0}$ corresponding to the discharge start power $P_{fs0}$ in step S8.

Then, the control unit 3 serves as, for example, the frequency controller 32, the duty controller 31, and the burst controller 33 to perform the burst mode to thereby alternately perform the discharge mode M1 and the non-discharge mode M2 based on the burst ratio b, the current frequency value of the switching frequency f, and the duty factor d in step S9 (see FIG. 3).

After completion of the operation in step S9, the control unit 3 repeatedly performs the operations in steps S3 to S5 and S7 to S9 until the determination in step S5 is affirmative, so that the switching frequency f gradually decreases toward the frequency $f_{s0}$ corresponding to the discharge start power $P_{fs0}$.

If a next value of the target output power Po* is input from the external controller 100 to the control unit 3, the control unit 3 is programmed to execute the next cycle of the switch control routine from step S1.

That is, the control unit 3 selectively performs the continuous mode in step S6 (see FIG. 5) and the burst mode in steps S7 to S9 (see FIG. 3) in accordance with the determination result in step S5.

Next, the following describes how the discharge generator 1 works, and also describes technical benefits achieved by the discharge generator 1.

In the discharge mode M1 of the burst mode, the control unit 3 is configured to control on-off switching operations of each switch 21 of the main circuit unit 2 to thereby cause the main circuit unit 2 to output the discharge start power $P_{fs0}$ during the predetermined first discharge period $T_{dis}$. That is, this configuration of the control unit 3 supplies, to the discharge load 7, the predetermined minimum power required for the discharge load 7 to generate discharge during the predetermined first discharge period $T_{dis}$.

This configuration therefore enables the input power $P_I$ supplied from the DC power source 8 to the main circuit unit 2 to be lowered, making it possible to reduce power loss in the main circuit unit 2.

Additionally, the control unit 3 is configured to calculate the burst ratio b in accordance with the above equation (1).

This configuration enables the average value Po' of the output power Po to be adjusted to the target output power Po*. That is, the burst mode carried out by the control unit 3 enables the product of the output power Po during the first discharge period $T_{dis}$ and the burst ratio b, which is expressed as b·Po, to become the average value Po' of the output power Po.

The control unit 3 adjusts the output power Po to the discharge start power $P_{fs0}$ during the first discharge period $T_{dis}$. Adjusting the burst ratio b to the value b·Po therefore enables the product of the burst ratio b (=Po*/$P_{fs0}$) and the discharge start power $P_{fs0}$, which is expressed as b·$P_{fs0}$ = (Po*/$P_{fs0}$)·$P_{fs0}$ equal to Po*, to be output as the average value Po' of the output power Po. That is, this configuration of the discharge generator 1 enables the target output power Po* to be output from the main circuit unit 2 as the average value Po' of the output power Po.

The discharge generator 1 is installed in a vehicle, and the DC power source 8 installed in a vehicle has a relatively small capacity. From this viewpoint, the discharge generator 1, which results in lower power loss in the main circuit unit 2, obtains a great benefit of enabling efficient usage of the DC power output from the DC power source 8.

As described above, the first embodiment provides the discharge generator 1 having lower power loss in the main circuit unit 2.

Note that the discharge generator 1 includes the main circuit unit 2 comprised of the push-pull circuit 26 and the resonant tank circuit 27. Note that the detailed descriptions of each of the push-pull circuit 26 and the resonant tank circuit 27 are disclosed in, for example, Japanese Patent Application Publications No. 2017-58931 and No. 2017-251542. The disclosure of Japanese Patent Application Publications No. 2017-58931 and No. 2017-251542 is incorporated entirely herein by reference.

The present disclosure is however not limited to the above structure of the main circuit unit 2 set forth above. Specifically, the main circuit unit 2 can be comprised of a known bridge inverter including the switches 21 connected in bridge configuration.

Figure 11:
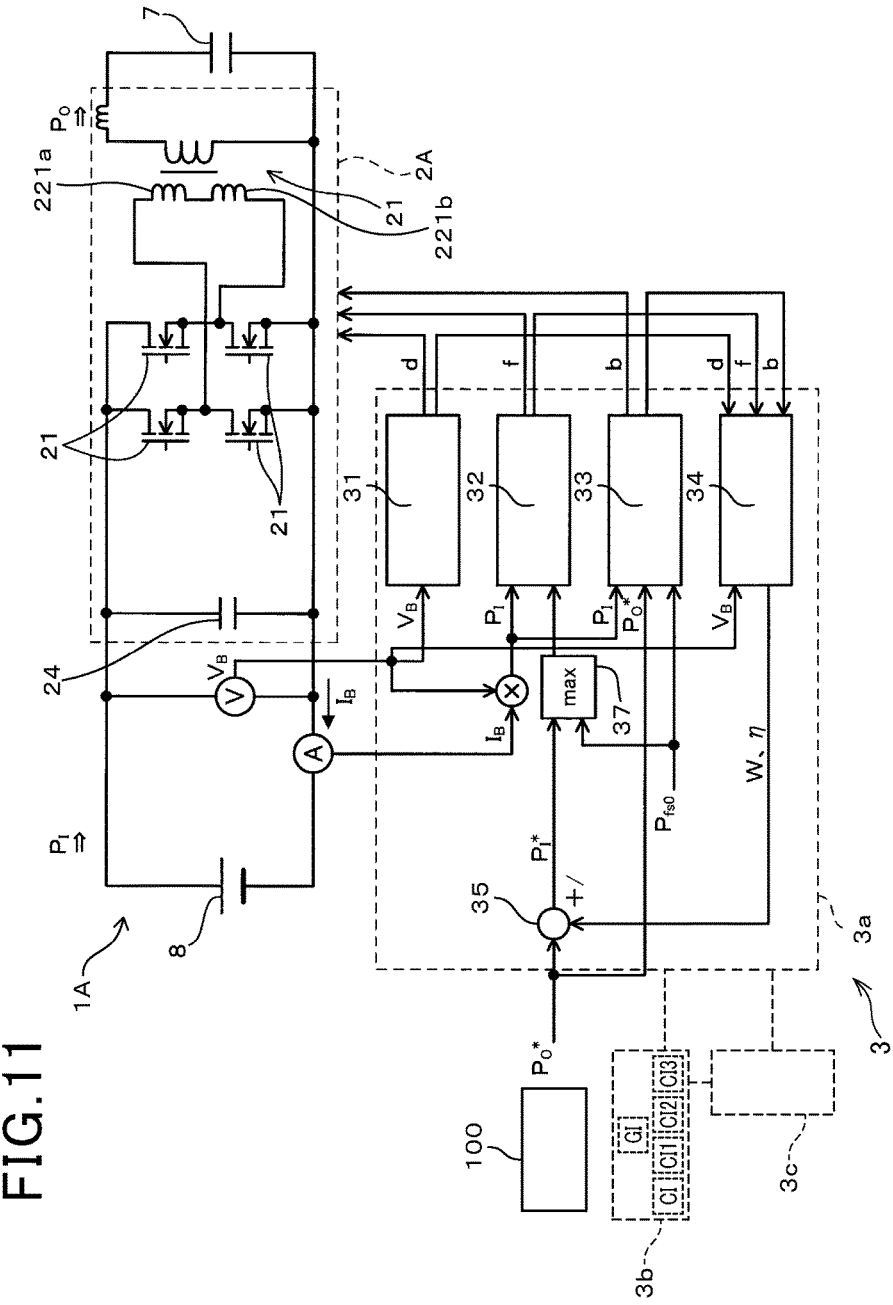
FIG. 11 is a circuit diagram schematically illustrating an overall configuration of a discharge generator according to a modification of the first embodiment.

Specifically, as illustrated in FIG. 11, a discharge generator 1A includes a main circuit unit 2A comprised of a bridge inverter including the switches 21 ($21_A$ to $21_D$) connected in an H bridge configuration. In addition, the smoothing capacitor 24 is connected in parallel to the DC power source 8. The positive electrode of the smoothing capacitor 24 is connected to the first end of each switch $21_C$, $21_D$, and the negative electrode of the smoothing capacitor 24 is connected to the first end of each switch $21_A$, $21_B$.

The discharge generator 1 according to the first embodiment is installed in a vehicle, but can be installed in another device.

Second Embodiment

The following describes a discharge generator 1 according to the second embodiment of the present disclosure with reference to FIGS. 12 to 15. The configuration and functions of the discharge generator 1 according to the second embodiment are mainly different from those of the discharge generator 1 according to the first embodiment by the following points. The following therefore mainly describes the different points.

The discharge generator 1 includes a control unit 3, which is different from the control unit 3 in how to control each switch 21.

Specifically, the control unit 3 includes a burst controller 33 configured to calculate, based on predetermined discharge sustaining power and the target output power Po*, the burst ratio b in accordance with the following equation (2):

$$b = Po^*/P_{fs1} \qquad (2)$$

Where $P_{fs1}$ represents the discharge sustaining power.

The discharge sustaining power $P_{fs1}$ represents predetermined minimum power required for the discharge load 7 to sustain generated discharge.

Like the first embodiment, when performing the burst mode, the control unit 3 alternately performs a discharge mode M1A and a non-discharge mode M2A. In other words, the control unit 3 cyclically performs the set of the discharge mode M1A and the non-discharge mode M2A in the burst mode.

In the discharge mode M1A, the control unit 3 controls alternative turn-on of the first set of the switches $21_A$ and $21_D$ in the first switching pattern and the second set of the switches $21_B$ and $21_C$ in the predetermined switching cycle during a predetermined second discharge period $T_{disA}$ to thereby cause the discharge load 7 to generate discharge and sustain the generated discharge.

In the non-discharge mode M2A, the control unit 3 drives no switches $21_A$ to $21_D$ during a predetermined stop period $T_{stop}$ to thereby prevent the discharge load 7 from generating discharge.

The second discharge period $T_{disA}$ is comprised of a discharge start period $T(f_{s0})$ during which the discharge start power $P_{fs0}$ is output from the main circuit unit 2, and a discharge sustaining period $T(f_{s1})$ during which the discharge sustaining power $P_{fs1}$ is output from the main circuit unit 2; the discharge sustaining power $P_{fs1}$ is lower than the discharge start power $P_{fs0}$.

For example, the discharge start period $T(f_{s0})$ can be expressed by the equation $1/f_{s0}$ where $f_{s0}$ represents a value of the switching frequency f corresponding to the discharge start power $P_{fs0}$. In contrast, the discharge sustaining period $T(f_{s1})$ can be expressed by the equation $1/(k \times f_{s1})$ where $f_{s1}$ represents a value of the switching frequency f corresponding to the discharge sustaining power $P_{fs1}$, and k represents a predetermined natural number equal to or more than 2.

Figure 12:
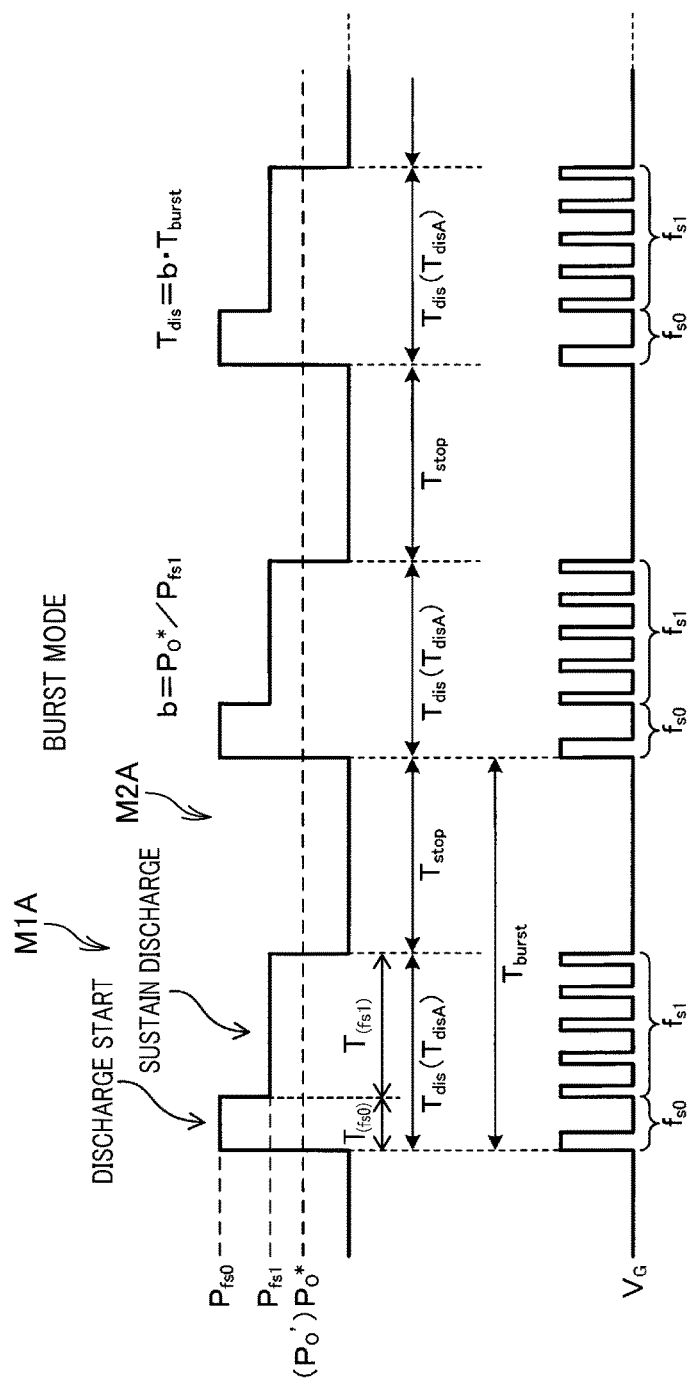
FIG. 12 is a timing chart schematically illustrating an example of the output voltage and the gate voltage in the burst mode according to the second embodiment.

Specifically, as illustrated in FIG. 12, the control unit 3 adjusts the switching frequency f to the frequency $f_{s0}$ during the discharge start period $T(f_{s0})$ to thereby cause the discharge load 7 to generate discharge. Thereafter, the control unit 3 adjusts the switching frequency f to the frequency $f_{s1}$ during the discharge sustaining period $T(f_{s1})$ to thereby cause the discharge load 7 to sustain the generated discharge.

Figure 13:
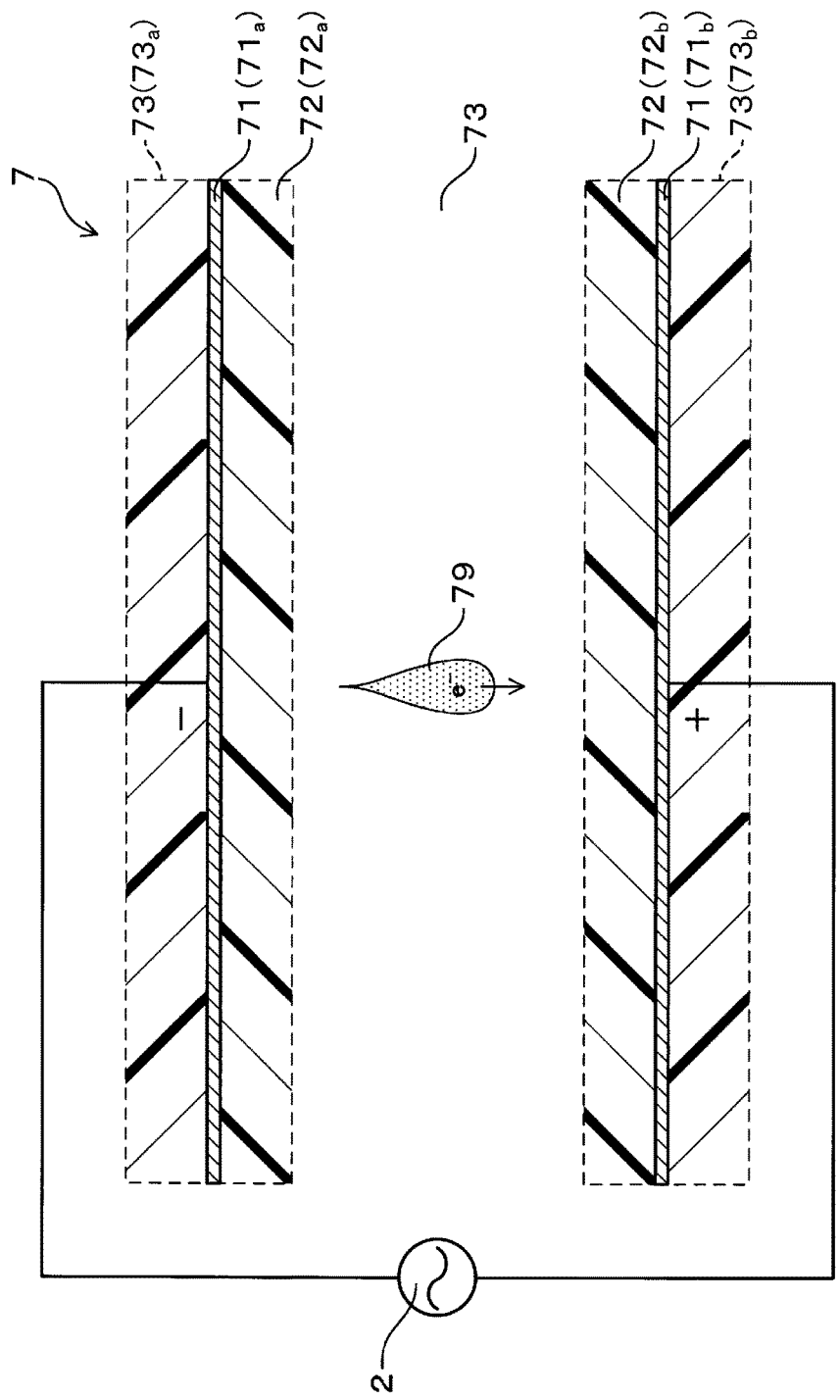
FIG. 13 is a schematic cross-sectional view of a discharge load when streamers are instantaneously generated according to the second embodiment.

Referring to FIG. 13, the discharge load 7 is comprised of a pair of plate-like electrodes 71 (71a, 71b) parallely arranged to face each other. The discharge load 7 is also comprised of a pair of inner barrier layers 72 (72a, 72b) and a pair of outer barrier layers 73 (73a, 73b).

Each of the inner barrier layers 72a and 72b is mounted on an inner surface of the corresponding one of the plate-like electrodes 71a and 71b, which faces an inner surface of the corresponding other of the plate-like electrodes 71a and 71b.

Each of the inner barrier layers 72a and 72b has, for example, a constant thickness in a facing direction perpendicular thereto, providing a discharge space 73 defined between the inner barrier layers 72a and 72b.

Each of the outer barrier layers 73a and 73b is mounted on an outer surface of the corresponding one of the plate-like electrodes 71a and 71b, which is opposite to the inner surface of the corresponding one of the plate-like electrodes 71a and 71b. Each of the outer barrier layers 73a and 73b has, for example, a constant thickness in the facing direction perpendicular thereto.

When the main circuit unit 2 applies an AC voltage across the electrodes 71a and 71b, streamers 79, each of which is a strip of electrons, moves from, for example, one barrier layer 72a to the other barrier layer 72b. After each streamer 79 has reached the major surface of the other barrier layer 72b, each streamer 79 diffuses along the major surface of the other barrier layer 72b. While each streamer 79 remains on the barrier layer 72b, even if a relatively low AC voltage is applied across the electrodes 71a and 71b, it is possible to cause electrons to move from the barrier layer 72b to the barrier layer 72a.

That is, even if the output power Po of the main circuit unit 2 is lower than the discharge start power $P_{fs0}$ and is applied across the electrodes 71a and 71b, the applied output power Po causes electrodes to move from the barrier layer 72b to the barrier layer 72a, resulting in discharge being generated between the barrier layers 72a and 72b.

If a long time has elapsed since the electrons moved to the barrier layer 72b, the electrons completely disappear along the major surface of the other barrier layer 72b. After the electrons have completely disappeared along the major surface of the other barrier layer 72b, discharge is generated between the barrier layers 72a and 72b only when at least the discharge start power $P_{fs0}$ is applied across the barrier layers 72a and 72b.

From these characteristics of the discharge load 7, the control unit 3 is configured to output the discharge start power $P_{fs0}$ during the start of a discharge task (see FIG. 12), and thereafter output the discharge sustaining power $P_{fs1}$, which is lower than the discharge start power $P_{fs0}$. This enables the input power $P_I$ to be lowered during the second discharge period $T_{disA}$, thus resulting in lower power loss in the main circuit unit 2.

Figure 15:
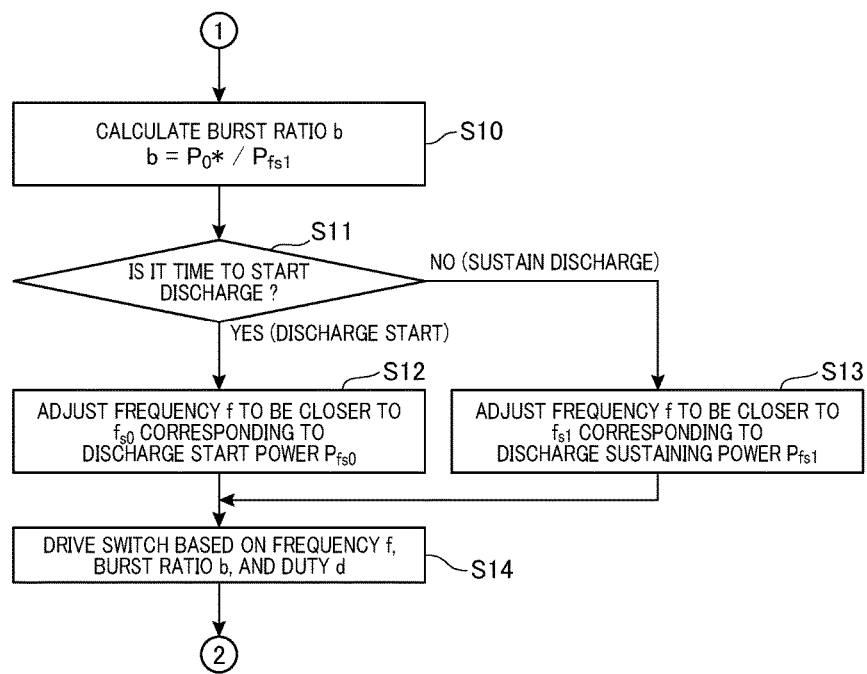
FIG. 15 is a flowchart schematically illustrating a switch control routine according to the second embodiment.

Next, the following describes a switch control routine carried out by the control unit 3 with reference to the flowchart of FIG. 15.

FIG. 15 illustrates only the operations of the control unit 3 in the burst mode, which are different from those of the control unit 3 in the burst mode according to the first embodiment. That is, the operations in steps S1 to S6 of the control unit 3 in the continuous mode according to the second embodiment are identical to the operations in steps S1 to S6 of the control unit 3 in the continuous mode according to the first embodiment.

Upon determining execution of the burst mode, the control unit 3 serves as, for example, the burst controller 33 to calculate the burst ratio b in accordance with the equation (2) in step S10.

Next, the control unit 3 determines whether it is time to start discharge or sustain generated discharge in step S11.

Upon determining that it is time to start discharge (YES in step S11), the control unit 3 serves as, for example, the frequency controller 32 to perform the feedback control of the switching frequency f of each switch 21 in step S12. That is, in step S12, the control unit 3 decrements the switching frequency f from the current value of the switching frequency f which is the maximum value $f_{max}$ at the first time, by a predetermined value, thus updating the decremented value of the switching frequency f as the current frequency value. This reduces the switching frequency f down toward the frequency $f_{s0}$ corresponding to the discharge start power $P_{fs0}$ in step S12. Then, the switch control routine proceeds to step S14.

Otherwise, upon determining that it is time to sustain generated discharge (NO in step S11), the control unit 3 serves as, for example, the frequency controller 32A to perform the feedback control of the switching frequency f of each switch 21 in step S13. That is, in step S13, the control unit 3 decrements the switching frequency f from the current value of the switching frequency f, which is the maximum value $f_{max}$ at the first time, by a predetermined value, thus updating the decremented value of the switching frequency f as the current frequency value. This reduces the switching frequency f down toward the frequency $f_{s1}$ corresponding to the discharge sustaining power $P_{fs1}$ in step S13.

Then, the control unit 3 serves as, for example, the frequency controller 32, the duty controller 31, and the burst controller 33 to perform the burst mode to thereby alternately perform the discharge mode M1A and the non-discharge mode M2A based on the burst ratio b, the current frequency value of the switching frequency f, and the duty factor d in step S14 (see FIG. 12).

After completion of the operation in step S14, the control unit 3 repeatedly performs the operations in steps S3 to S5 and S11, S12 and S14 or the operations in step S3 to S5 and S11, S13, and S14 until the determination in step S5 is affirmative, so that the switching frequency f gradually decreases toward the frequency $f_{s0}$ corresponding to the discharge start power $P_{fs0}$ or the frequency $f_{s1}$ corresponding to the discharge sustaining power $P_{fs1}$.

If a next value of the target output power Po* is input from the external controller 100 to the control unit 3, the control unit 3 is programmed to execute the next cycle of the switch control routine from step S1.

That is, the control unit 3 selectively performs the continuous mode in step S6 (see FIG. 5) and the burst mode in steps S10, S11, S12, and S14 or in steps S10, S11, S13, and S14 (see FIG. 12) in accordance with the determination result in step S5.

Next, the following describes how the discharge generator 1 works, and also describes technical benefits achieved by the discharge generator 1.

In the discharge mode M1A of the burst mode, the control unit 3 is configured to control on-off switching operations of each switch 21 of the main circuit unit 2 to thereby cause the main circuit unit 2 to selectively output the discharge start power $P_{fs0}$ and the discharge sustaining power $P_{fs1}$ during the predetermined second discharge period $T_{disA}$.

That is, the control unit 3 causes the main switch unit 2 to output the discharge start power $P_{fs0}$ during the discharge start period $T(f_{s0})$ at the start of the discharge task, and, after the discharge start period $T(f_{s0})$, causes the main switch unit 2 to output the discharge sustaining power $P_{fs1}$ during the discharge sustaining period $T(f_{s1})$.

That is, because the discharge start power $P_{fs0}$ is output from the main circuit unit 2 to the discharge load 7 at the start of the discharge task during the predetermined second discharge period $T_{disA}$, this configuration of the discharge generator 1 enables the discharge load 7 to reliably generate discharge.

In addition, because the discharge sustaining power $P_{fs1}$ is output from the main circuit unit 2 to the discharge load 7 after the discharge is generated during the predetermined second discharge period $T_{disA}$, this configuration of the discharge generator 1 enables the total output power Po during the second discharge period $T_{disA}$ to be lowered.

This configuration therefore enables the input power $P_I$ supplied from the DC power source 8 to the main circuit unit 2 to be lowered, making it possible to reduce power loss in the main circuit unit 2.

Additionally, the control unit 3 is configured to calculate the burst ratio b in accordance with the above equation (2).

The control unit 3 adjusts the output power Po to the discharge sustaining power $P_{fs1}$ during most period in the second discharge period $T_{dis}$. Adjusting the burst ratio b to the value b·Po therefore enables the product of the burst ratio b (=Po*/$P_{fs1}$) and the discharge sustaining power $P_{fs1}$, which is expressed as b·$P_{fs1}$=(Po*/$P_{fs1}$)·$P_{fs1}$ equal to Po*, to be output as the average value Po' of the output power Po. That is, this configuration of the discharge generator 1 enables the target output power Po* to be output from the main circuit unit 2 as the average value Po' of the output power Po.

The second embodiment also obtains similar benefits to those obtained by the first embodiment.

Third Embodiment

Figure 16:
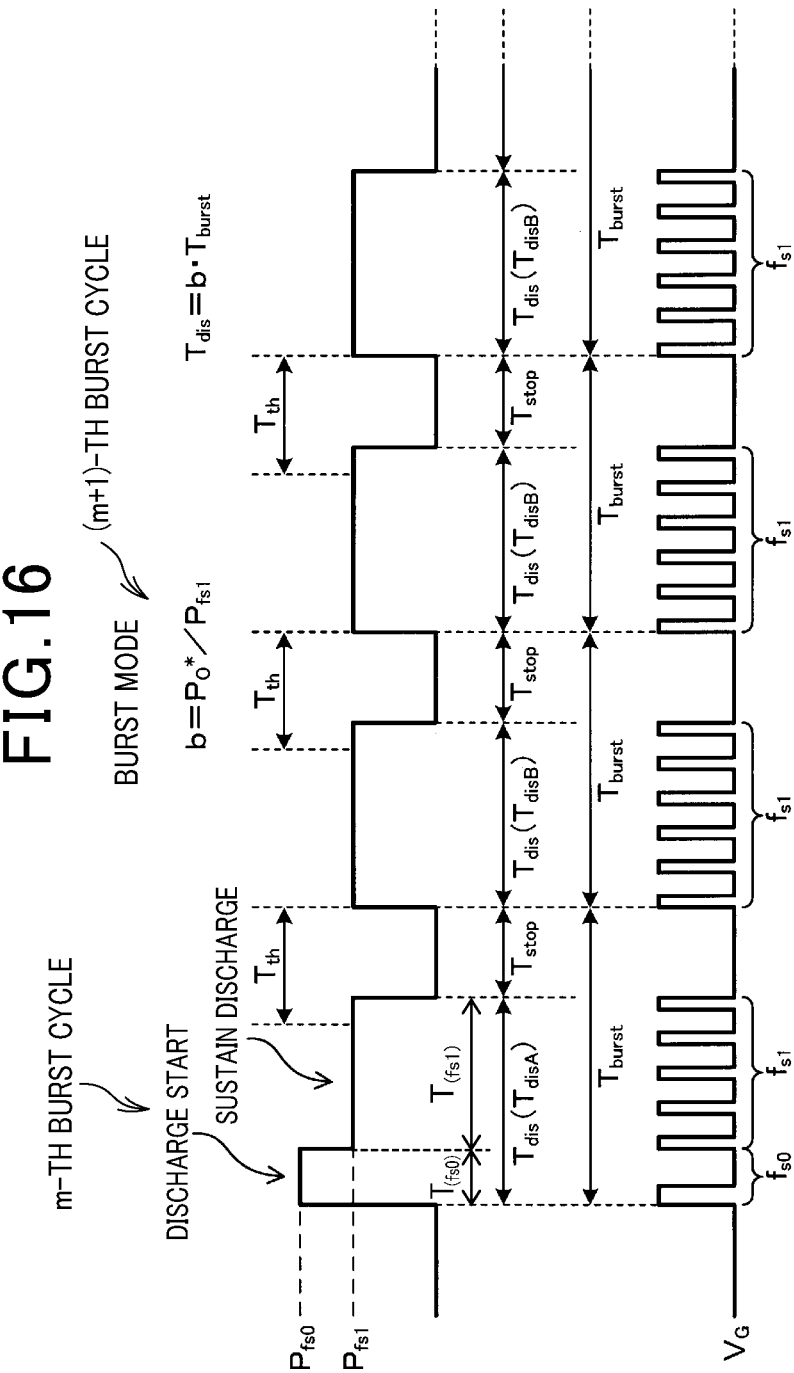
FIG. 16 is a timing chart schematically illustrating an example of the output voltage and the gate voltage in the burst mode when non-discharge period is shorter than a threshold period according to the third embodiment.
Figure 17:
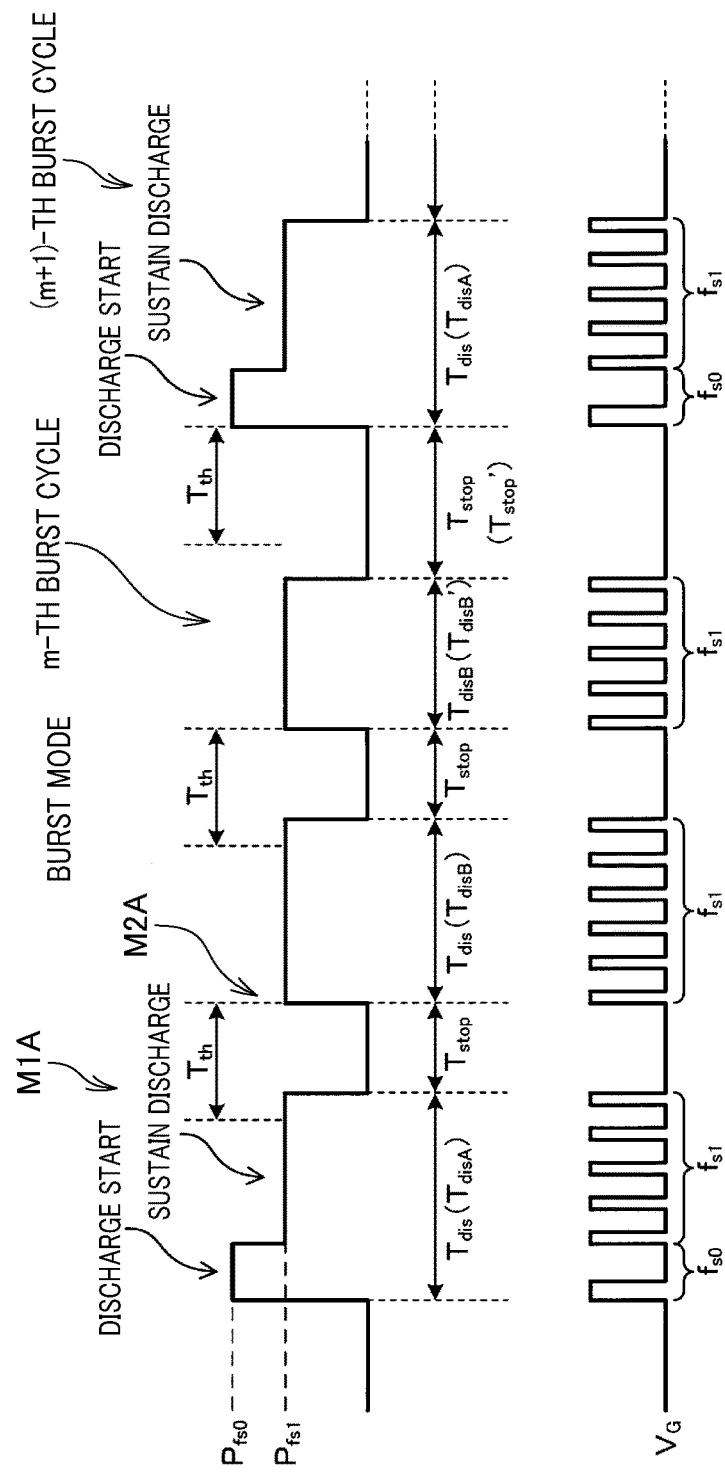
FIG. 17 is a timing chart schematically illustrating an example of the output voltage and the gate voltage in the burst mode when non-discharge period is equal to or longer than the threshold period according to the third embodiment.
Figure 18:
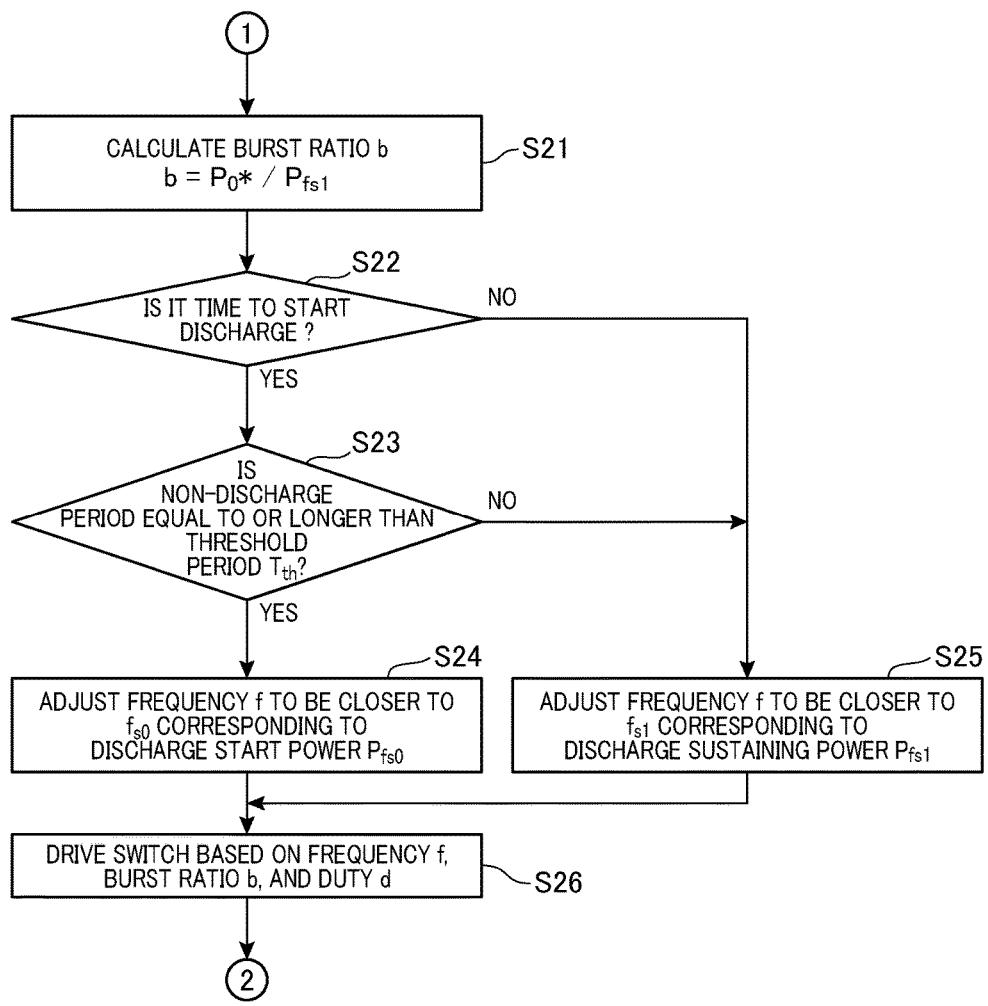
FIG. 18 is a flowchart schematically illustrating a switch control routine according to the third embodiment.

The following describes a discharge generator according to the third embodiment of the present disclosure with reference to FIGS. 16 to 18. The configuration and functions of the discharge generator according to the third embodiment are mainly different from those of the discharge generator 1 according to the second embodiment by the following points. The following therefore mainly describes the different points.

Like the second embodiment, when performing the burst mode, the control unit 3 alternately performs the discharge mode M1A and the non-discharge mode M2A. In other words, the control unit 3 cyclically performs the set of the discharge mode M1A and the non-discharge mode M2A in the burst mode.

In particular, if the stop period $T_{stop}$, during which no discharge is generated, after the second discharge period $T_{disA}$ at a current m-th burst cycle (m is a natural integer) is shorter than a predetermined threshold period $T_{th}$, the control unit 3 controls the switches 21 to thereby cause the main switch unit 2 to output the discharge sustaining power $P_{fs1}$ during a third discharge period $T_{disB}$ at the next (m+1)-th burst cycle (see FIG. 16).

Additionally, if the stop period $T_{stop}$, during which no discharge is generated, after the second discharge period $T_{disA}$ or third discharge period $T_{disB}$ at a current m-th burst cycle is longer than the predetermined threshold period $T_{th}$, the control unit 3 controls the switches 21 to thereby cause the main switch unit 2 to output the discharge start power $P_{fs0}$ during the second discharge period $T_{disA}$ at the next (m+1)-th burst cycle (see FIG. 17).

Figure 14:
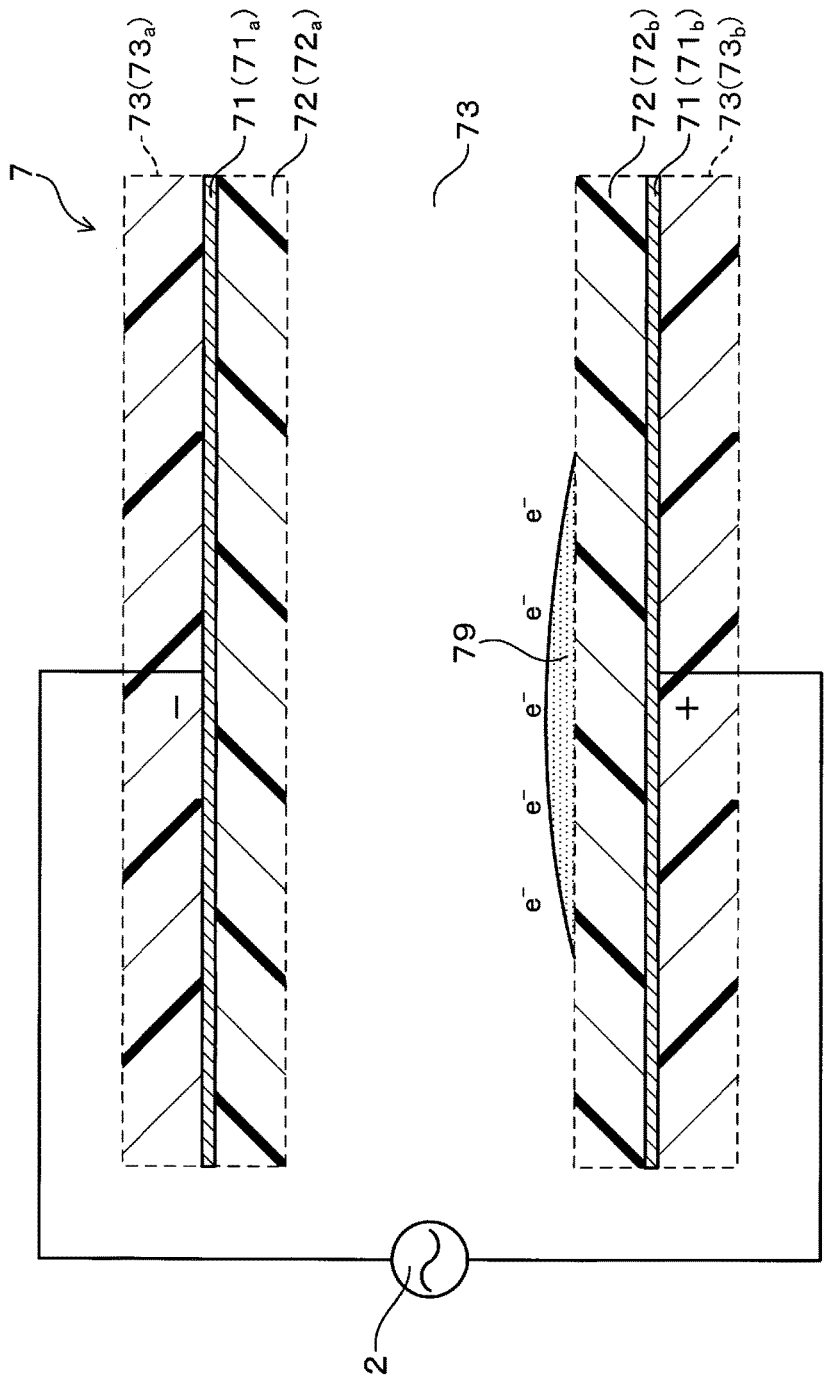
FIG. 14 is a schematic cross-sectional view of the discharge load when streamers remain on a barrier layer of the discharge load according to the second embodiment.

If the threshold period $T_{th}$ has not elapsed since discharge was generated at a previous burst cycle, electrons remain on the barrier layer 72b (see FIG. 14). For this reason, merely applying the discharge sustaining power $P_{fs1}$ to the discharge load 7 during the third discharge period $T_{disB}$ at the next burst cycle enables the discharge load 7 to generate discharge. This therefore enables the input power $P_I$ supplied to the main circuit unit 2 to be lowered during the third discharge period $T_{disB}$, thus resulting in lower power loss in the main circuit unit 2.

As illustrated in FIG. 16, the control unit 3 is configured to control the switching frequency f of each switch 21 to thereby adjust the output power Po.

Specifically, the control unit 3 is configured to (1) Adjust the switching frequency f of each switch 21 to the frequency $f_{s0}$ corresponding to the discharge start power $P_{fs0}$ during the discharge start period $T(f_{s0})$ of the second discharge period $T_{disA}$ (2) Thereafter, adjust the switching frequency f of each switch 21 to the frequency $f_{s1}$ corresponding to the discharge sustaining power $P_{fs1}$ during the remaining discharge sustaining period $T(f_{s1})$ of the second discharge period $T_{disA}$ (3) Adjust the switching frequency f of each switch 21 to the frequency $f_{s1}$ corresponding to the discharge sustaining power $P_{fs1}$ during the third discharge period $T_{disB}$ In addition, as illustrated in FIG. 17, if the target output power Po* decreases so that the discharge period at a m-th current burst cycle becomes shorter than, for example, the third discharge period $T_{disB}$. This results in the discharge stop period (see $T_{stop}'$) at the m-th current burst cycle becoming longer than the discharge stop period $T_{stop}$, resulting in the period during which no discharge is generated being longer than the threshold period $T_{th}$.

In this case, the control unit 3 according to the third embodiment is configured to (1) Adjust the switching frequency f of each switch 21 to the frequency $f_{s0}$ corresponding to the discharge start power $P_{fs0}$ during the discharge start period $T(f_{s0})$ of the second discharge period $T_{disA}$ at the next (m+1)-th burst cycle (2) Thereafter, adjust the switching frequency f of each switch 21 to the frequency $f_{s1}$ corresponding to the discharge sustaining power $P_{fs1}$ during the remaining discharge sustaining period $T(f_{s1})$ of the second discharge period $T_{dis}A$ at the next (m+1)-th burst cycle This enables the discharge load 7 to reliably generate discharge even after lapse of a long discharge stop period.

Next, the following describes a switch control routine carried out by the control unit 3 according to the third embodiment with reference to the flowchart of FIG. 18.

Upon determining execution of the burst mode, the control unit 3 serves as, for example, the burst controller 33 to calculate the burst ratio b in accordance with the equation (2) in step S21.

Next, the control unit 3 determines whether it is time to start discharge or sustain generated discharge in step S22.

Upon it being determined that it is time to start discharge (YES in step S22), the switch control routine proceeds to step S23. Otherwise, upon it being determined that it is not time to start discharge (NO in step S22), the switch control routine proceeds to step S25.

In step S23, the control unit 3 determines whether no discharge has been generated for at least the threshold period $T_{th}$.

Upon it being determined that no discharge has been generated for at least the threshold period $T_{th}$ (YES in step S23), the control unit 3 serves as, for example, the frequency controller 32 to perform the feedback control of the switching frequency f of each switch 21 in step S24. That is, in step S24, the control unit 3 decrements the switching frequency f from the current value of the switching frequency f which is the maximum value $f_{max}$ at the first time, by a predetermined value, thus updating the decremented value of the switching frequency f as the current frequency value. This reduces the switching frequency f down toward the frequency $f_{s0}$ corresponding to the discharge start power $P_{fs0}$ in step S24. Then, the switch control routine proceeds to step S26.

Otherwise, upon it being determined that discharge has been generated for at least the threshold period $T_{th}$ (NO in step S23), the switch control routine proceeds to step S25.

In step S25, the control unit 3 serves as, for example, the frequency controller 32 to perform the feedback control of the switching frequency f of each switch 21 in step S25. That is, in step S25, the control unit 3 decrements the switching frequency f from the current value of the switching frequency f, which is the maximum value $f_{max}$ at the first time, by a predetermined value, thus updating the decremented value of the switching frequency f as the current frequency value. This reduces the switching frequency f down toward the frequency $f_{s1}$ corresponding to the discharge sustaining power $P_{fs1}$ in step S25.

Then, the control unit 3 serves as, for example, the frequency controller 32, the duty controller 31, and the burst controller 33 to perform the burst mode to thereby alternately perform the discharge mode M1A and the non-discharge mode M2A based on the burst ratio b, the current frequency value of the switching frequency f, and the duty factor d in step S26 (see FIGS. 16 and 17).

After completion of the operation in step S26, the control unit 3 repeatedly performs the operations in steps S3 to S5 and S21, S22, S23, S24, and S26 or the operations in step S3 to S5 and S21, S22, S23, S25, and S26 until the determination in step S5 is affirmative, so that the switching frequency f gradually decreases toward the frequency $f_{s0}$ corresponding to the discharge start power $P_{fs0}$ or the frequency $f_{s1}$ corresponding to the discharge sustaining power $P_{fs1}$.

If a next value of the target output power Po* is input from the external controller 100 to the control unit 3, the control unit 3 is programmed to execute the next cycle of the switch control routine from step S1.

That is, the control unit 3 causes the main switch unit 2 to output the discharge start power $P_{fs0}$ during the discharge start period $T(f_{s0})$ the second discharge period $T_{disA}$ upon determining that no discharge has been generated for at least the threshold period $T_{th}$ and that it is time to start discharge (YES in steps S22 and S23). This enables the discharge load 7 to reliably generate discharge.

In contrast, the control unit 3 causes the main switch unit 2 to output the discharge start power $P_{fs1}$ during the discharge sustaining period $T(f_{s1})$ of the second discharge period $T_{dis}A$ or during the third discharge period $T_{disB}$ (NO in step S22 or NO in step S23).

The third embodiment therefore obtains similar benefits to those obtained by the second embodiment.

Fourth Embodiment

Figure 19:
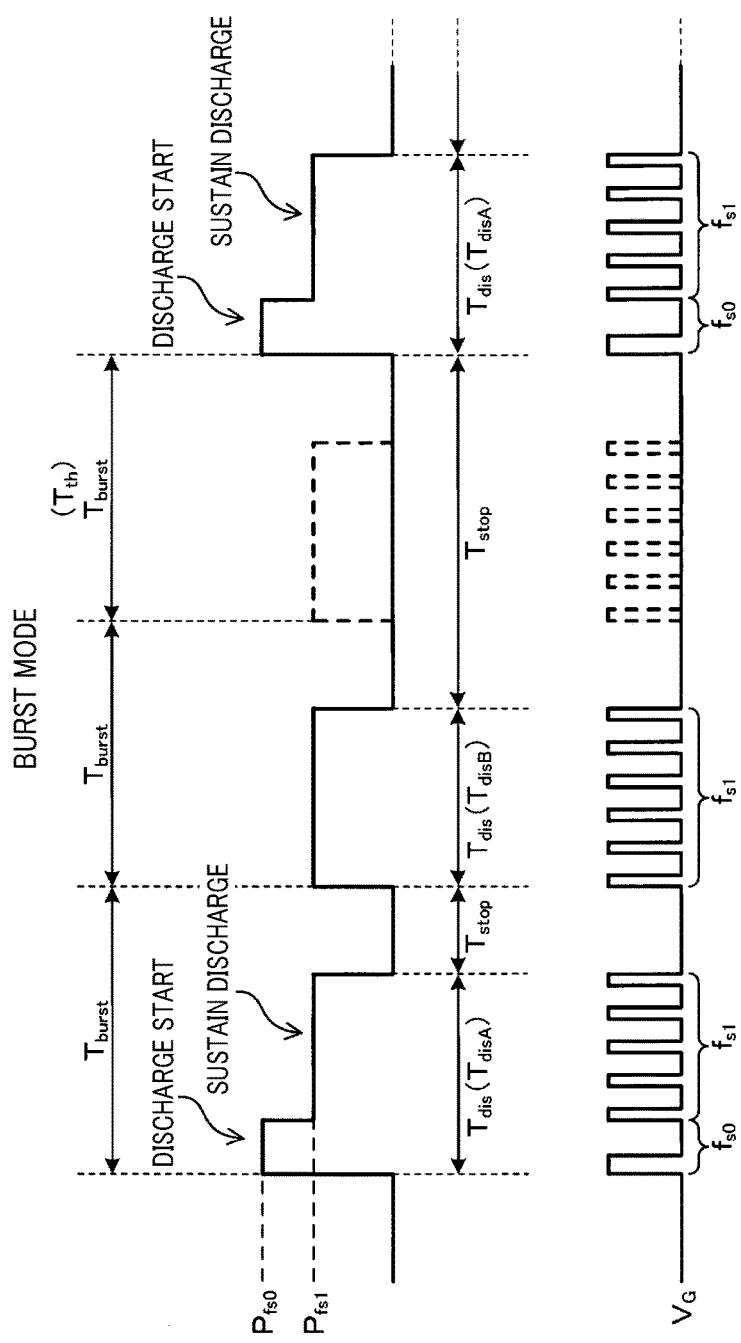
FIG. 19 is a timing chart schematically illustrating an example of the output voltage and the gate voltage in the burst mode when non-discharge period is equal to or longer than a burst period according to the fourth embodiment of the present disclosure.
Figure 20:
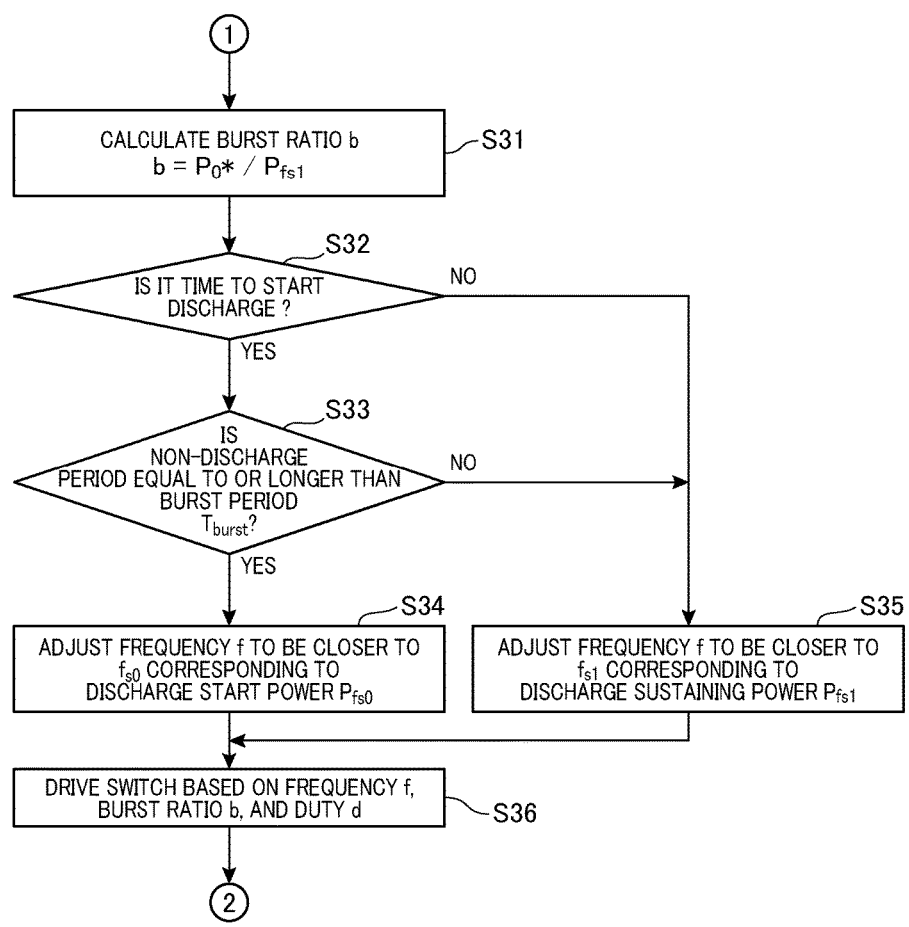
FIG. 20 is a flowchart schematically illustrating a switch control routine according to the fourth embodiment.

The following describes a discharge generator according to the fourth embodiment of the present disclosure with reference to FIGS. 19 and 20. The configuration and functions of the discharge generator according to the fourth embodiment are mainly different from those of the discharge generator 1 according to the second embodiment by the following points. The following therefore mainly describes the different points.

Like the second embodiment, when performing the burst mode, the control unit 3 alternately performs the discharge mode M1A and the non-discharge mode M2A. In other words, the control unit 3 cyclically performs the set of the discharge mode M1A and the non-discharge mode M2A in the burst mode.

In particular, if the stop period $T_{stop}$, during which no discharge is generated, after the second discharge period $T_{disA}$ at a current m-th burst cycle (m is a natural integer), is shorter than the burst period $T_{burst}$ set as the threshold period $T_{th}$, the control unit 3 controls the switches 21 to thereby cause the main switch unit 2 to output the discharge sustaining power $P_{fs1}$ during the third discharge period $T_{disB}$ at the next (m+1)-th burst cycle (see FIG. 19). That is, if at least a small amount of discharge has been generated in the burst period $T_{burst}$ at the current m-th burst cycle, the control unit 3 causes the main switch unit 2 to output the discharge sustaining power $P_{fs1}$ during the third discharge period $T_{disB}$ at the next (m+1)-th burst cycle.

Additionally, if the stop period $T_{stop}$ during which no discharge is generated after the second discharge period $T_{disA}$ or third discharge period $T_{disB}$ at a current m-th burst cycle is longer than the burst period $T_{burst}$, the control unit 3 controls the switches 21 to thereby cause the main switch unit 2 to output the discharge start power $P_{fs0}$ during the second discharge period $T_{disA}$ in the next (m+1)-th burst cycle (see FIG. 19).

For example, if the target output power Po* instantaneously falls down, so that no discharge is generated, resulting in the period during which no discharge is generated becomes longer than the burst period $T_{burst}$. In this case, no electrons likely remain on the barrier layer 72b (see FIG. 14). For this reason, for generating discharge, it is necessary to apply the discharge start power $P_{fs0}$ to the discharge load 7 at the next burst cycle. For this reason, in this case, the control unit 3 causes the main switch unit 2 to output the discharge start power $P_{fs0}$ during the second discharge period $T_{disA}$.

In contrast, if the period during which no discharge is generated is shorter than the burst period $T_{burst}$, electrons are likely to remain on the barrier layer 72b (see FIG. 14). For this reason, merely applying the discharge sustaining power $P_{fs1}$ to the discharge load 7 during the third discharge period $T_{disB}$ at the next burst cycle enables the discharge load 7 to generate discharge. This therefore enables the input power $P_I$ supplied to the main circuit unit 2 to be lowered during the third discharge period $T_{disB}$, thus resulting in lower power loss in the main circuit unit 2A.

Next, the following describes a switch control routine carried out by the control unit 3 according to the third embodiment with reference to the flowchart of FIG. 20.

Upon determining execution of the burst mode, the control unit 3 serves as, for example, the burst controller 33 to calculate the burst ratio b in accordance with the equation (2) in step S31.

Next, the control unit 3 determines whether it is time to start discharge or sustain generated discharge in step S32.

Upon it being determined that it is time to start discharge (YES in step S32), the switch control routine proceeds to step S33. Otherwise, upon it being determined that it is not time to start discharge (NO in step S32), the switch control routine proceeds to step S35.

In step S33, the control unit 3 determines whether non-discharge period for which no discharge has been generated is equal to or longer than the burst period $T_{burst}$.

Upon it being determined that non-discharge period for which no discharge has been generated is equal to or longer than the burst period $T_{burst}$ (YES in step S33), the control unit 3 serves as, for example, the frequency controller 32 to perform the feedback control of the switching frequency f of each switch 21 in step S34. That is, in step S34, the control unit 3 decrements the switching frequency f from the current value of the switching frequency f, which is the maximum value $f_{max}$ at the first time, by a predetermined value, thus updating the decremented value of the switching frequency f as the current frequency value. This reduces the switching frequency f down toward the frequency $f_{s0}$ corresponding to the discharge start power $P_{fs0}$. Then, the switch control routine proceeds to step S36.

Otherwise, upon it being determined that non-discharge period for which no discharge has been generated is shorter than the burst period $T_{burst}$, i.e. discharge has been generated for at least the threshold period $T_{th}$, (NO in step S33), the switch control routine proceeds to step S35.

In step S35, the control unit 3 serves as, for example, the frequency controller 32 to perform the feedback control of the switching frequency f of each switch 21. That is, in step S35, the control unit 3 decrements the switching frequency f from the current value of the switching frequency f which is the maximum value $f_{max}$ at the first time, by a predetermined value, thus updating the decremented value of the switching frequency f as the current frequency value. This reduces the switching frequency f down toward the frequency $f_{s1}$ corresponding to the discharge sustaining power $P_{fs1}$ in step S35.

Then, the control unit 3 serves as, for example, the frequency controller 32, the duty controller 31, and the burst controller 33 to perform the burst mode to thereby alternately perform the discharge mode M1A and the non-discharge mode M2A based on the burst ratio b, the current frequency value of the switching frequency f, and the duty factor d in step S36 (see FIG. 19).

After completion of the operation in step S36, the control unit 3 repeatedly performs the operations in steps S3 to S5 and S31, S32, S33, S34, and S36 or the operations in step S3 to S5 and S31, S32, S33, S35, and S36 until the determination in step S5 is affirmative, so that the switching frequency f gradually decreases toward the frequency $f_{s0}$ corresponding to the discharge start power $P_{fs0}$ or the frequency $f_{s1}$ corresponding to the discharge sustaining power $P_{fs1}$.

If a next value of the target output power Po* is input from the external controller 100 to the control unit 3, the control unit 3 is programmed to execute the next cycle of the switch control routine from step S1.

The above fourth embodiment obtains similar benefits to those obtained by the second embodiment.

Fifth Embodiment

Figure 21:
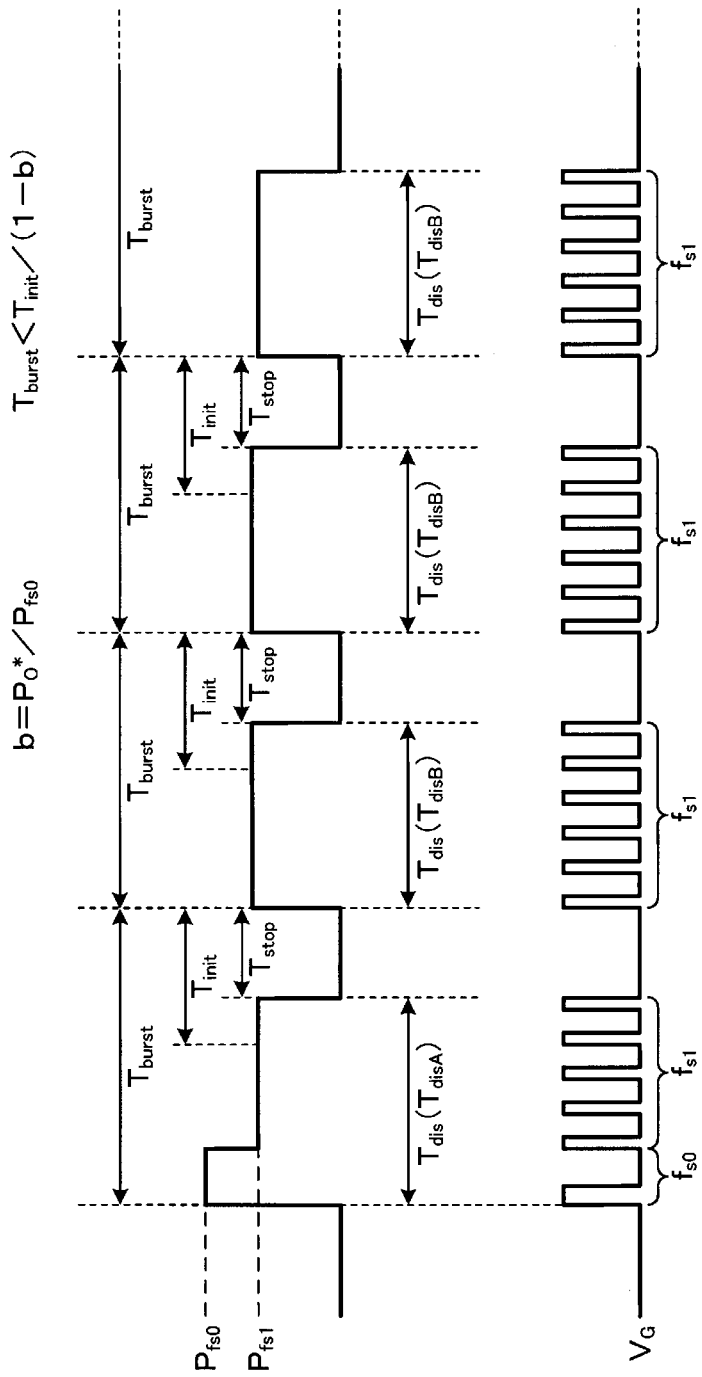
FIG. 21 is a timing chart schematically illustrating an example of the output voltage and the gate voltage in the burst mode according to the fifth embodiment of the present disclosure.
Figure 22:
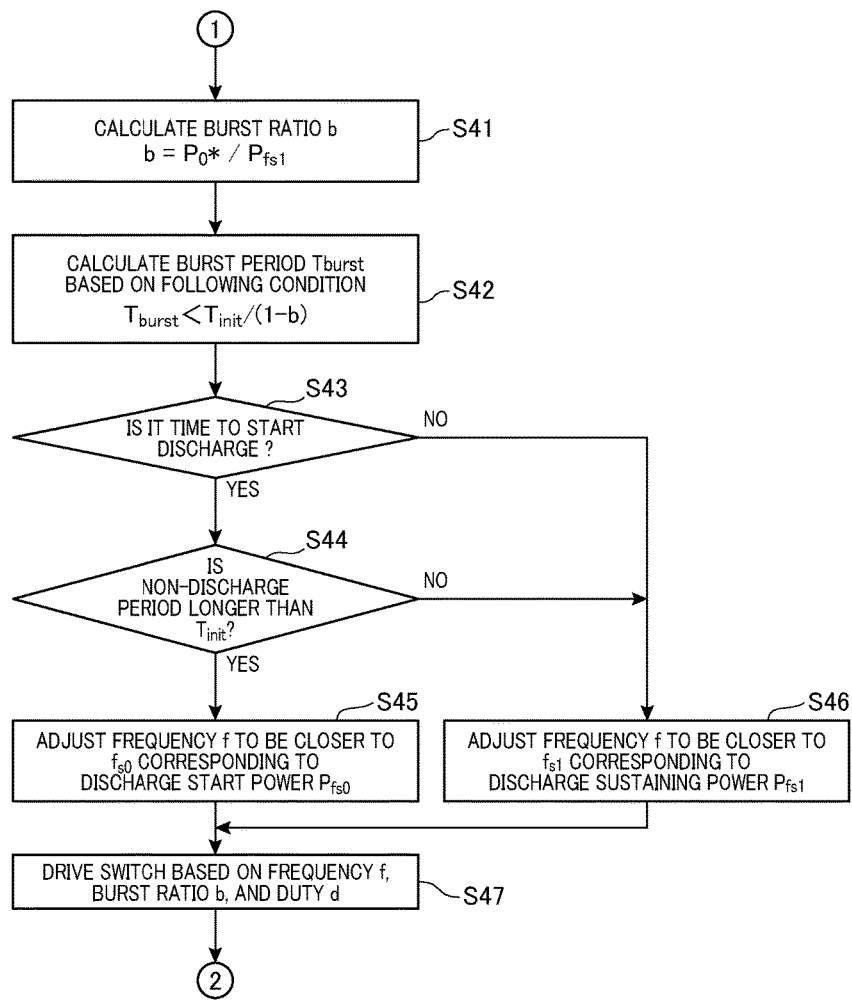
FIG. 22 is a flowchart schematically illustrating a switch control routine according to the fifth embodiment.
Figure 23:
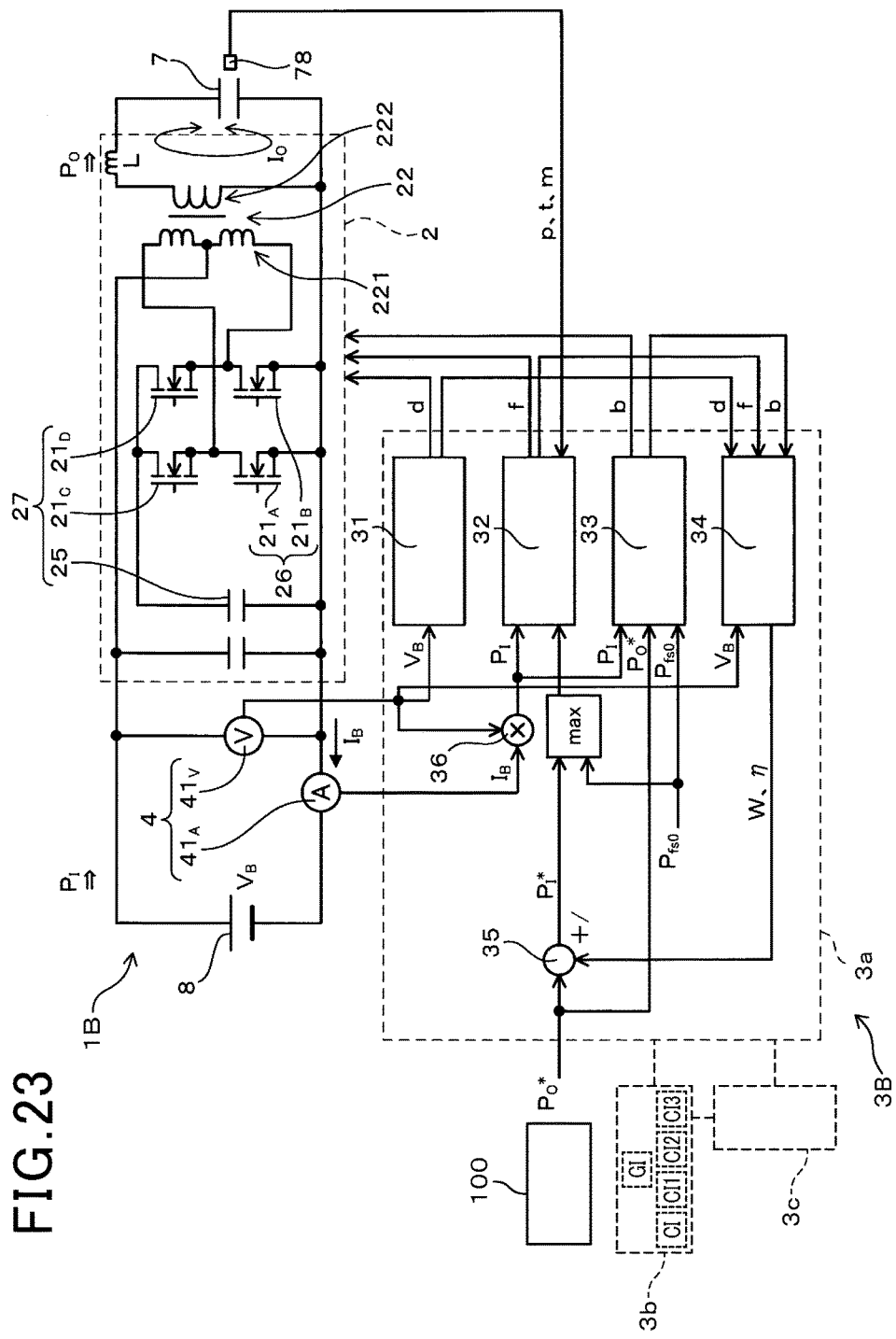
FIG. 23 is a circuit diagram schematically illustrating an overall configuration of a discharge generator according to the sixth embodiment of the present disclosure.

The following describes a discharge generator according to the fifth embodiment of the present disclosure with reference to FIGS. 21 and 22. The configuration and functions of the discharge generator according to the fifth embodiment are mainly different from those of the discharge generator 1 according to the second embodiment by the following points. The following therefore mainly describes the different points.

Like the second embodiment, when performing the burst mode, the control unit 3 alternately performs the discharge mode M1A and the non-discharge mode M2A. In other words, the control unit 3 cyclically performs the set of the discharge mode MIA and the non-discharge mode M2A in the burst mode.

Like the third embodiment, if the stop period $T_{stop}$, during which no discharge is generated, after the second discharge period $T_{disA}$ at a current m-th burst cycle (m is a natural integer) is shorter than the predetermined threshold period $T_{th}$, the control unit 3 controls the switches 21 to thereby cause the main switch unit 2 to output the discharge sustaining power $P_{fs1}$ during the third discharge period $T_{disB}$ at the next (m+1)-th burst cycle.

At that time, a discharge initial period $T_{int}$ is defined; the discharge initial period $T_{int}$ represents an upper limit of the stop period $T_{stop}$ such that, if the stop period $T_{stop}$ is set to be equal to or shorter than the discharge initial period $T_{int}$, it is possible to adjust the output power Po of the main switch unit 2 to the discharge sustaining power $P_{fs1}$ for each burst cycle except for the first burst cycle including the second discharge period $T_{disA}$.

Specifically, as illustrated in FIG. 21, the control unit 3 is configured to control the switches 21 to thereby cause each burst period $T_{burst}$ to satisfy the following equation (3):

$$T_{burst} < T_{int}/(1-b) \qquad (3)$$

If the burst period $T_{burst}$ satisfies the above equation (3), it is possible to set the stop period $T_{stop}$ to be shorter than the discharge initial period $T_{int}$. This therefore enables the output power Po of the main switch unit 2A to be adjusted to the discharge sustaining power $P_{fs1}$ for each burst cycle except for the first burst cycle including the second discharge period $T_{disA}$.

This therefore enables the input power $P_I$ supplied to the main circuit unit 2 to be lowered during the third discharge period $T_{disB}$, thus resulting in lower power loss in the main circuit unit 2.

Next, the following describes a switch control routine carried out by the control unit 3 according to the third embodiment with reference to the flowchart of FIG. 22.

Upon determining execution of the burst mode, the control unit 3 serves as, for example, the burst controller 33 to calculate the burst ratio b in accordance with the equation (2) in step S41.

Next, the control unit 3 calculates the burst period $T_{burst}$ to satisfy the above equation (3) in step S42.

For example, in step S42, the control unit 3 calculates the burst period $T_{burst}$ in accordance with the following equation (4):

$$T_{burst} = 0.8 \times T_{int}/(1-b) \qquad (4)$$

Next, the control unit 3 determines whether it is time to start discharge or sustain generated discharge in step S43.

Upon it being determined that it is time to start discharge (YES in step S43), the switch control routine proceeds to step S44. Otherwise, upon it being determined that it is not time to start discharge (NO in step S43), the switch control routine proceeds to step S46.

In step S44, the control unit 3 determines whether non-discharge period for which no discharge has been generated is longer than the discharge initial period $T_{int}$, i.e. determines whether it is time to perform the second discharge period $T_{disA}$ at the start of the burst mode.

Upon it being determined that non-discharge period for which no discharge has been generated is longer than the discharge initial period $T_{int}$ (YES in step S44), the control unit 3 serves as, for example, the frequency controller 32 to perform the feedback control of the switching frequency f of each switch 21 in step S45. That is, in step S45, the control unit 3 decrements the switching frequency f from the current value of the switching frequency f which is the maximum value $f_{max}$ at the first time, by a predetermined value, thus updating the decremented value of the switching frequency f as the current frequency value. This reduces the switching frequency f down toward the frequency $f_{s0}$ corresponding to the discharge start power $P_{fs0}$. Then, the switch control routine proceeds to step S47.

Otherwise, upon it being determined that non-discharge period for which no discharge has been generated is equal to or shorter than the discharge initial period $T_{int}$ (NO in step S44), the switch control routine proceeds to step S46.

In step S46, the control unit 3 serves as, for example, the frequency controller 32 to perform the feedback control of the switching frequency f of each switch 21. That is, in step S46, the control unit 3 decrements the switching frequency f from the current value of the switching frequency f which is the maximum value $f_{max}$ at the first time, by a predetermined value, thus updating the decremented value of the switching frequency f as the current frequency value. This reduces the switching frequency f down toward the frequency $f_{s1}$ corresponding to the discharge sustaining power $P_{fs1}$ in step S46.

Then, the control unit 3 serves as, for example, the frequency controller 32, the duty controller 31, and the burst controller 33 to perform the burst mode to thereby alternately perform the discharge mode M1A and the non-discharge mode M2A based on the burst ratio b, the current frequency value of the switching frequency f, and the duty factor d in step S47 (see FIG. 21).

After completion of the operation in step S47, the control unit 3 repeatedly performs the operations in steps S3 to S5 and S41, S42, S43, S44, S45, and S47 or the operations in step S3 to S5 and S41, S42, S43, S44, S46, and S47 until the determination in step S5 is affirmative, so that the switching frequency f gradually decreases toward the frequency $f_{s0}$ corresponding to the discharge start power $P_{fs0}$ or the frequency $f_{s1}$ corresponding to the discharge sustaining power $P_{fs1}$.

If a next value of the target output power Po* is input from the external controller 100 to the control unit 3, the control unit 3 is programmed to execute the next cycle of the switch control routine from step S1.

The above fifth embodiment obtains similar benefits to those obtained by the second embodiment.

Sixth Embodiment

The following describes a discharge generator according to the sixth embodiment of the present disclosure with reference to FIGS. 23 to 27. The configuration and functions of the discharge generator according to the sixth embodiment are mainly different from those of the discharge generator 1 according to the second embodiment by the following points. The following therefore mainly describes the different points.

A discharge generator 1B according to the sixth embodiment includes at least one sensor 78 for measuring three power-related parameters correlating with respective pressure p, temperature t, and humidity, i.e. moisture, m of gas flowing through the discharge load 7. The at least one sensor 78 outputs, to the control unit B, measurement signals respectively indicative of the measured values of the gas pressure p, gas temperature t, and gas humidity m.

The control unit 3B is configured to calculate the discharge start power $P_{fs0}$ and discharge sustaining $P_{fs1}$ in accordance with the measured values of the gas pressure p, gas temperature t, and gas humidity m.

Figure 24:
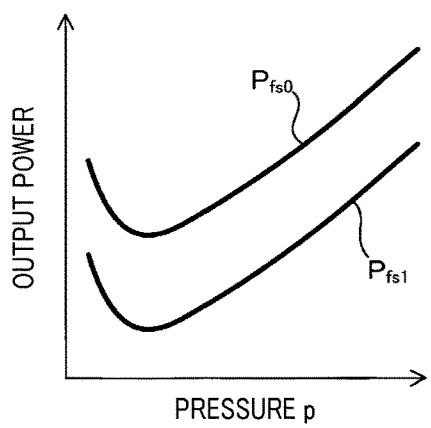
FIG. 24 is a graph schematically illustrating a first correlation between a pressure of gas flowing in the discharge load and the output power according to the sixth embodiment.

FIG. 24 schematically illustrates, as a graph, a first correlation between the gas pressure p and each of the discharge start power $P_{fs0}$ and discharge sustaining $P_{fs1}$.

Figure 25:
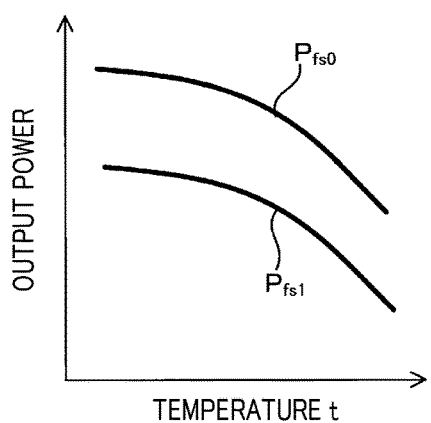
FIG. 25 is a graph schematically illustrating a second correlation between a temperature of gas flowing in the discharge load and the output power according to the sixth embodiment.
Figure 26:
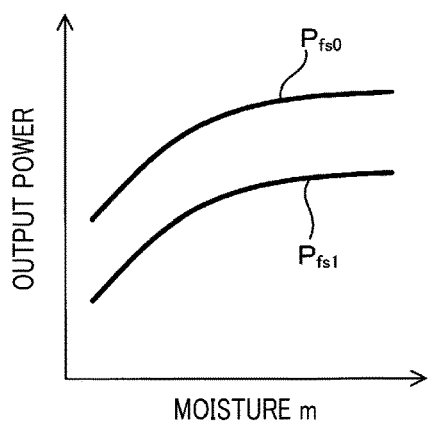
FIG. 26 is a graph schematically illustrating a third correlation between a humidity of gas flowing in the discharge load and the output power according to the sixth embodiment.

Similarly, FIG. 25 schematically illustrates, as a graph, a second correlation between the gas temperature t and each of the discharge start power $P_{fs0}$ and discharge sustaining $P_{fs1}$, and FIG. 26 schematically illustrates, as a third graph, a correlation between the gas humidity m and each of the discharge start power $P_{fs0}$ and discharge sustaining $P_{fs1}$.

Each of the first to third correlations is stored in the memory $3b$ as respective correlation information items CI1 to CI3.

That is, the control unit 3B calculates a value of each of the discharge start power $P_{fs0}$ and discharge sustaining $P_{fs1}$ in accordance with the correlation information items CI1 to CI3 and the measurement signals sent from the sensor 78.

The control unit 3B is configured to control the switches 21 using the precisely calculated discharge start power $P_{fs0}$ and discharge sustaining power $P_{fs1}$.

Figure 27:
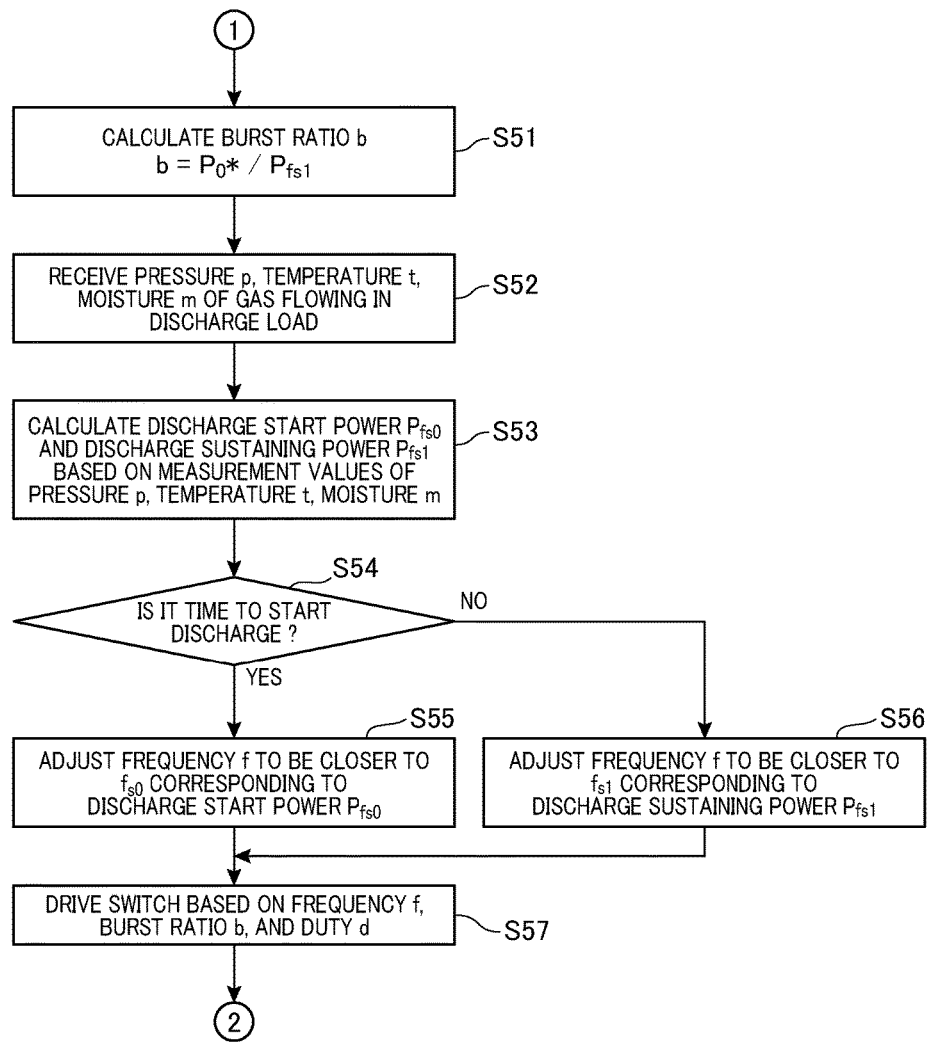
FIG. 27 is a flowchart schematically illustrating a switch control routine according to the sixth embodiment.

Next, the following describes a switch control routine carried out by the control unit 3B according to the sixth embodiment with reference to the flowchart of FIG. 27. Note that the control unit 3B controls the switches 21 such that the waveform of the output power Po is similar to the waveform of the output power Po in the second embodiment (see FIG. 12).

Upon determining execution of the burst mode, the control unit 3B serves as, for example, the burst controller 33B to calculate the burst ratio b in accordance with the equation (2) in step S51.

Next, the control unit 3B receives the measurement signals indicative of the respective gas p, gas temperature t, and gas humidity m sent from the sensor 78 in step S52.

Then, the control unit 3B calculates a value of the discharge start power $P_{fs0}$, which matches with (1) The measured value of the first gas-related parameter p on the first correlation (2) The measured value of the second gas-related parameter t on the second correlation (3) The measured value of the third gas-related parameter m on the third correlation in step S53 Similarly, the control unit 3B calculates a value of the discharge sustaining power $P_{fs1}$, which matches with (1) The measured value of the first gas-related parameter p on the first correlation (2) The measured value of the second gas-related parameter t on the second correlation (3) The measured value of the third gas-related parameter m on the third correlation in step S53

Next, the control unit 3B determines whether it is time to start discharge or sustain generated discharge in step S54.

Upon determining that it is time to start discharge (YES in step S54), the control unit 3B serves as, for example, the frequency controller 32A to perform the feedback control of the switching frequency f of each switch 21 in step S55. That is, in step S55, the control unit 3B decrements the switching frequency f from the current value of the switching frequency f which is the maximum value $f_{max}$ at the first time, by a predetermined value, thus updating the decremented value of the switching frequency f as the current frequency value. This reduces the switching frequency f down toward the frequency $f_{s0}$ corresponding to the discharge start power $P_{fs0}$ in step S55. Then, the switch control routine proceeds to step S57.

Otherwise, upon determining that it is time to sustain generated discharge (NO in step S54), the control unit 3B serves as, for example, the frequency controller 32A to perform the feedback control of the switching frequency f of each switch 21 in step S56. That is, in step S56, the control unit 3B decrements the switching frequency f from the current value of the switching frequency f, which is the maximum value $f_{max}$ at the first time, by a predetermined value, thus updating the decremented value of the switching frequency f as the current frequency value. This reduces the switching frequency f down toward the frequency $f_{s1}$ corresponding to the discharge sustaining power $P_{fs1}$ in step S56.

Then, the control unit 3B serves as, for example, the frequency controller 32, the duty controller 31, and the burst controller 33 to perform the burst mode to thereby alternately perform the discharge mode M1A and the non-discharge mode M2A based on the burst ratio b, the current frequency value of the switching frequency f, and the duty factor d in step S57.

After completion of the operation in step S57, the control unit 3B repeatedly performs the operations in steps S3 to S5 and S51, S52, S53, S54, S55, and S57 or the operations in step S3 to S5 and S51, S52, S53, S54, S56, and S57 until the determination in step S5 is affirmative, so that the switching frequency f gradually decreases toward the frequency $f_{s1}$ corresponding to the discharge start power $P_{fs0}$ or the frequency $f_{s1}$ corresponding to the discharge sustaining power $P_{fs1}$.

If a next value of the target output power Po* is input from the external controller 100 to the control unit 3B, the control unit 3B is programmed to execute the next cycle of the switch control routine from step S1.

The above sixth embodiment obtains similar benefits to those obtained by the second embodiment.

The control unit 3B can calculate a value of each of the discharge start power $P_{fs0}$ and discharge sustaining power $P_{fs1}$ in accordance with at least one of the first gas-related parameter p, second gas-related parameter t, and third gas-related parameter m.

The control unit 3B can calculate a value of at least one of the discharge start power $P_{fs0}$ and discharge sustaining power $P_{fs1}$ in accordance with at least one of the first gas-related parameter p, second gas-related parameter t, and third gas-related parameter m.

While the illustrative embodiments and their modifications of the present disclosure have been described herein, the present disclosure is not limited to the embodiments and their modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A discharge generator comprising:
   a switch circuit comprising a switch connected to a direct-current power source; and
   a control unit configured to control on-off switching operations of the switch to thereby convert direct-current power supplied from the direct-current power source to the switch circuit into alternating-current output power, thus causing a discharge load to generate discharge based on the output power,
   wherein the control unit is configured to:
      switchably perform a continuous mode and a burst mode in accordance with determination of whether target output power as a target value of the output power is higher than predetermined discharge start power,
      the continuous mode continuously performing on-off switching operations of the switch,
      the burst mode alternately performing:

a discharge mode that performs on-off switching operations of the switch to thereby cause the discharge load to generate discharge during a discharge period; and a non-discharge mode that performs no switching operations of the switch, to thereby prevent the discharge load from generating discharge during a stop period, the discharge start power being minimum power required for the discharge load to generate discharge; and control, in the burst mode, on-off switching operations of the switch to thereby:

cause a burst ratio to be set to a value expressed by the following equation (1):

$$b = Po^*/P_{fs0} \quad (1)$$

where b represents the burst ratio, Po* represents the target output power, and $P_{fs0}$ represents the discharge start power, the burst ratio being defined as a ratio of the discharge period to a burst period, the burst period being the sum of the discharge period and the stop period; and cause, in the burst mode, the switch circuit to output, as the output power, the discharge start power during the discharge period.

2. A discharge generator comprising:

a switch circuit comprising a switch connected to a direct-current power source; and a control unit configured to control on-off switching operations of the switch to thereby convert direct-current power supplied from the direct-current power source to the switch circuit into alternating-current output power, thus causing a discharge load to generate discharge based on the output power, wherein the control unit is configured to:

switchably perform a continuous mode and a burst mode in accordance with determination of whether target output power as a target value of the output power is higher than predetermined discharge sustaining power, the continuous mode continuously performing on-off switching operations of the switch, the burst mode alternately performing:

a discharge mode that performs on-off switching operations of the switch to thereby cause the discharge load to generate discharge during a discharge period; and a non-discharge mode that performs no switching operations of the switch, to thereby prevent the discharge load from generating discharge during a stop period, the discharge sustaining power being minimum power required for the discharge load to sustain the discharge generated by the discharge mode; and control, in the burst mode, on-off switching operations of the switch to thereby:

cause a burst ratio to be set to a value expressed by the following equation (2):

$$b = Po^*/P_{fs1} \quad (2)$$

where b represents the burst ratio, Po* represents the target output power, and $P_{fs1}$ represents the discharge sustaining power, the burst ratio being defined as a ratio of the discharge period to a burst period; and cause, in the burst mode, the switch circuit to output, as the output power, discharge start power and thereafter output the discharge sustaining power during the discharge period, the discharge start power being minimum power required for the discharge load to generate discharge.

3. The discharge generator according to claim 2, wherein:

the control unit is configured to:

cyclically perform the bust mode including the discharge mode and the non-discharge mode;

cause, in a current cycle of the burst mode, the switch circuit to only output, as the output power, the discharge sustaining power during a second discharge period upon the stop period in a previous cycle of the burst mode being shorter than a predetermined threshold period; and cause, in the current cycle of the burst mode, the switch circuit to output, as the output power, the discharge start power and thereafter output the discharge sustaining power during the discharge period ($T_{disA}$) upon the stop period in the previous cycle of the burst mode being equal to or longer than the predetermined threshold period.

4. The discharge generator according to claim 3, wherein the burst period is set to the threshold period.

5. The discharge generator according to claim 2, wherein:

the control unit is configured to:

cyclically perform the bust mode including the discharge mode and the non-discharge mode;

cause, in a current cycle of the burst mode, the switch circuit to only output, as the output power, the discharge sustaining power during a second discharge period upon non-discharge period in the burst mode being shorter than a predetermined discharge initial period ($T_{int}$); and cause, in the current cycle of the burst mode, the switch circuit to output, as the output power, the discharge start power and thereafter output the discharge sustaining power during the discharge period upon the non-discharge period in the burst mode being equal to or longer than the discharge initial period, the discharge initial period being defined such that, if the stop period is set to be equal to or shorter than the discharge initial period, the output power of the switch circuit being allowed to be adjusted only to the discharge sustaining power for each burst cycle except for the first burst cycle including the second discharge period, the burst period, the discharge initial period, and the burst ratio satisfying the following equation (3):

$$T_{burst} < T_{int}/(1-b) \quad (3)$$

where:

$T_{burst}$ represents the burst period; and $T_{int}$ represents the discharge initial period.

6. The discharge generator according to claim 2, further comprising:

a sensor configured to measure a value of at least one of power-related parameters including a pressure of gas flowing through the discharge load, a temperature of the gas, and a humidity of the gas, wherein the control unit is configured to calculate at least one of the discharge start power and the discharge sustaining power in accordance with the value of the at least one of the power-related parameters measured by the sensor.

* * * * *